US009591815B2

(12) United States Patent
Fujiyama et al.

(10) Patent No.: US 9,591,815 B2
(45) Date of Patent: Mar. 14, 2017

(54) PLANT CULTIVATION DEVICE, BOX, END SECTION UNIT

(71) Applicant: Panasonic Intellectual Property Management Co., Ltd., Osaka (JP)

(72) Inventors: Hiromitsu Fujiyama, Hyogo (JP); Shinya Hirota, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 124 days.

(21) Appl. No.: 14/648,506

(22) PCT Filed: Jun. 24, 2014

(86) PCT No.: PCT/JP2014/003371
§ 371 (c)(1),
(2) Date: May 29, 2015

(87) PCT Pub. No.: WO2015/001763
PCT Pub. Date: Jan. 8, 2015

(65) Prior Publication Data

US 2016/0165821 A1 Jun. 16, 2016

(30) Foreign Application Priority Data

Jul. 1, 2013 (JP) ................................ 2013-138237
Dec. 4, 2013 (JP) ................................ 2013-251271

(51) Int. Cl.
*A01G 9/02* (2006.01)
*A01G 31/02* (2006.01)
*A01G 9/00* (2006.01)

(52) U.S. Cl.
CPC .............. *A01G 31/02* (2013.01); *A01G 9/00* (2013.01); *Y02P 60/216* (2015.11)

(58) Field of Classification Search
CPC .................. A01G 9/1423; A01G 9/104; A01G 2009/1046; A01G 2009/1053; A01G 2009/106; A01G 9/1066; A01G 9/10
(Continued)

(56) References Cited

U.S. PATENT DOCUMENTS 4,279,101 A * 7/1981 Leroux .................. A01G 31/02 47/64
4,310,990 A * 1/1982 Payne .................... A01G 31/02 47/59 R
(Continued)

FOREIGN PATENT DOCUMENTS

JP H01-211433 A 8/1989
JP H10-094333 A 4/1998
(Continued)

OTHER PUBLICATIONS

International Search Report for corresponding International Application No. PCT/JP2014/003371 mailed Sep. 16, 2014.
(Continued)

*Primary Examiner* — Kristen C Hayes
(74) *Attorney, Agent, or Firm* — Renner, Otto, Boisselle & Sklar, LLP

(57) ABSTRACT

A plant cultivation device includes a plurality of boxes, a connection unit, and an end section unit. Each box is provided in an inner space thereof with a cultivation chamber and a light source housing chamber. The plurality of boxes are arranged in a line. The connection unit mutually connects two adjacent boxes. The end section unit is mounted to an end section of a box which is arranged in an end of the line. The end section of the box is unconnected to the connection unit. Each box includes a ventilation opening for ventilating the cultivation chamber, and a ventilation port for air cooling the light source housing chamber. Each of the connection unit and the end section unit includes a first
(Continued)

ventilation passage through which air flows into the ventilation opening, and a second ventilation passage through which air flows into the ventilation port.

13 Claims, 16 Drawing Sheets

(58) Field of Classification Search
USPC .......................................................... 47/66.6
See application file for complete search history.

(56) References Cited

U.S. PATENT DOCUMENTS 4,387,534 A * 6/1983 Lewandowski .......... A01G 9/00 109/54
4,608,776 A * 9/1986 Kooy ...................... A01G 5/06 312/116
5,269,094 A * 12/1993 Wolverton ............ A01G 31/02 210/602
6,655,083 B2 * 12/2003 Reed ..................... A01G 9/024 47/67
6,796,624 B2 * 9/2004 Park ...................... A47B 63/00 108/50.11
6,837,002 B2 * 1/2005 Costa .................... A01G 31/02 47/60
7,080,482 B1 * 7/2006 Bradley ................ A01G 31/02 47/60
7,497,049 B2 * 3/2009 Amberson ............ A01G 9/104 209/373
7,788,849 B1 * 9/2010 Cleveland ............... A01G 9/10 206/201
8,327,580 B2 * 12/2012 Miyahara ................ A01G 9/16 47/60
8,375,631 B2 * 2/2013 Siminoff ............... A01G 31/02 47/62 C
8,453,379 B1 * 6/2013 Kumar .................... A01G 9/02 47/39
8,555,547 B2 * 10/2013 Hashimoto ........... A01G 9/045 47/48.5
8,839,553 B2 * 9/2014 Toro ........................ A01G 9/02 220/23.87
8,984,806 B2 * 3/2015 Uchiyama ............... A01G 9/24 47/17
9,003,700 B2 * 4/2015 Kumar .................. A47B 85/06 47/39
9,173,352 B1 * 11/2015 Moreland ............... A01K 1/00
9,215,925 B2 * 12/2015 Scotti .................... A47B 37/04
2007/0084107 A1 * 4/2007 Ganti ...................... A01G 9/02 47/39
2009/0260282 A1 * 10/2009 Hashimoto ........... A01G 9/045 47/20.1
2011/0192082 A1 * 8/2011 Uchiyama ............... A01G 9/24 47/66.6
2012/0174481 A1 * 7/2012 Toro ........................ A01G 9/02 47/86
2012/0285085 A1 * 11/2012 Siminoff ............... A01G 31/02 47/62 C
2013/0264921 A1 * 10/2013 Kumar .................. A47B 85/06 312/235.5
2014/0318012 A1 * 10/2014 Fujiyama ............ F24F 11/0001 47/62 R
2016/0212953 A1 * 7/2016 Janssen ................. A01G 9/025

FOREIGN PATENT DOCUMENTS

JP H11-113419 A 4/1999
JP 2006-122566 A 5/2006
JP 2011-229578 A 11/2011
JP 3176525 U 6/2012
JP 2013-165706 A 8/2013
WO WO 2009/119778 A1 10/2009

OTHER PUBLICATIONS

Form PCT/ISA/237 for corresponding International Application No. PCT/JP2014/003371 dated Sep. 16, 2014.

* cited by examiner 412
411
41
302
(30)
31
40H
54
10 (10h)
13
50
53
20
45
10 (10g)
60
21
20
40G
22
51
10 (10f)
13
40F
20
48
40E
46
10 (10e)
52
47
301
(30)
48
48
301
(30)
47
46
10 (10d)
43
13
40D
20
48
44
10 (10c)
40C
51
45
20
10 (10b)
60
21
40B
20
54
22
10 (10a)
13
50
52
31
53
302
(30)
40A
32
412
411
41
40

PLANT CULTIVATION DEVICE, BOX, END SECTION UNIT

TECHNICAL FIELD

The invention relates generally to a plant cultivation device, a box and an end section unit, more particularly, to a plant cultivation device including a box which is provided in an inner space thereof with a cultivation chamber for cultivating plant, and a box and an end section unit used for the plant cultivation device.

BACKGROUND ART

In this day and age, a plant cultivation device provided with a cultivation chamber for cultivating plant is known (for example, refer to JP H10-94333 A (hereinafter referred to as "Document 1")). The plant cultivation device described in Document 1 adopts a composition that the plant cultivation device takes air into a light source chamber in which an artificial light source is arranged, and supplies the air passed through the light source chamber into the cultivation chamber for cultivating plant. The air supplied into the cultivation chamber passes through the light source chamber, and then is introduced into the cultivation chamber after making contact with a cooling coil and a heater. Consequently, the plant cultivation device enables temperature adjustment of the air to be introduced into the cultivation chamber.

According to the composition described in Document 1, temperature of the air heated by the artificial light source is adjusted, by means of making contact with the cooling coil and the heater. For the above reason, the plant cultivation device requires energy to cool the cooling coil for disposal of heat energy from the artificial light source while the artificial light source is cooled by means of making contact with the air.

DISCLOSURE OF THE INVENTION

It is an object of the present invention to provide a plant cultivation device which can cool a light source without a cooling coil, further, to provide a box and an end section unit used for the plant cultivation device.

A plant cultivation device according to the present invention includes: a plurality of boxes arranged in a line, each of which is provided in an inner space thereof with a cultivation chamber for cultivating a plant and a light source housing chamber for housing a light source; a connection unit configured to mutually connect two adjacent boxes of the plurality of boxes; and an end section unit mounted to an end section of a box in an end of the line of the plurality of boxes arranged in the line. The end section of the box is unconnected to the connection unit. Each of the plurality of boxes further includes: a ventilation opening provided for ventilation in the cultivation chamber; and a ventilation port provided for air cooling in the light source housing chamber. Each of the connection unit and the end section unit includes a first ventilation passage through which air flows into the ventilation opening, and a second ventilation passage through which air flows into the ventilation port.

In the plant cultivation device, it is preferable that the ventilation opening includes a first ventilation opening provided in one wall of each box in a direction in which the plurality of boxes are arranged, and a second ventilation opening provided in the other wall of each box. In this case, it is preferable that the ventilation opening is configured to introduce air into the cultivation chamber through the first ventilation opening, and exhaust air from the cultivation chamber through the second ventilation opening. It is preferable that the ventilation port includes a first ventilation port opening in the one wall of each box in which the first ventilation opening is provided, and a second ventilation port opening in the other wall of each box in which the second ventilation opening is provided. It is preferable that the ventilation port is configured to introduce air into the light source housing chamber through the first ventilation port, and exhaust air from the light source housing chamber through the second ventilation port.

In the plant cultivation device, it is preferable that the first ventilation passage of the end section unit has one end opening downward and the other end facing the ventilation opening, and the second ventilation passage of the end section unit has one end opening downward and the other end facing the ventilation port.

In the plant cultivation device, it is preferable that the plurality of boxes, the connection unit and the end section unit are incorporated into furniture.

In the plant cultivation device, it is preferable that the plurality of boxes, the connection unit and the end section unit are incorporated into furniture. In this case, it is preferable that the first ventilation passage of the end section unit has one end opening downward and the other end facing the ventilation opening, and the second ventilation passage of the end section unit has one end opening downward and the other end facing the ventilation port. It is preferable that the furniture includes therein a third ventilation passage through which air flows between the furniture and the end section unit, and a vent port through which air flows between the furniture and outside of the furniture in at least part of a wall surrounding the third ventilation passage.

In the plant cultivation device, it is preferable that the plurality of boxes, the connection unit and the end section unit are incorporated into furniture, and the furniture includes therein a third ventilation passage through which air flows between the furniture and the end section unit, and a vent port through which air flows between the furniture and outside of the furniture in at least part of a wall surrounding the third ventilation passage.

In the plant cultivation device, it is preferable that each of the plurality of boxes further includes a reservoir provided besides the cultivation chamber and the light source housing chamber. In this case, it is preferable that the reservoir is configured to reserve liquid to be applied to the plants. It is preferable that the plant cultivation device further includes a sending apparatus sending the liquid from the reservoir of one box of two or more boxes among the plurality of boxes. It is preferable that the sending apparatus is configured to circulate the liquid in a path through the reservoir of the other box of the two or more boxes.

In the plant cultivation device, it is more preferable that each of the plurality of boxes includes an inflow port taking the liquid from outside into the reservoir, and an outflow port taking out the liquid reserved in the reservoir. In this case, it is preferable that the sending apparatus has a function of circulating the liquid between more than one box through inflow ports and outflow ports of the more than one box, and reservoirs of the more than one box are mutually connected through the inflow ports and outflow ports.

In the plant cultivation device, it is more preferable that the sending apparatus includes a submersible pump arranged in the reservoir.

In the plant cultivation device, it is preferable the sending apparatus includes an ejector for mixing air to the liquid in a channel flowing the liquid.

A box according to the present invention is used for one of the plant cultivation devices described above.

A end section unit according to the present invention is used for one of the plant cultivation devices described above.

According to the present invention, the configuration that air flows into the light source housing chamber apart from the cultivation chamber is adopted. Furthermore, air flows in a state that the plurality of boxes are arranged in the line, and connected, using the connection units. For that reason, there is an advantage that since a cooling coil is not required for disposal of heat energy from the light source, the device can be made by a simple configuration, and also energy for operating the cooling coil is not required.

BRIEF DESCRIPTION OF THE DRAWINGS

Preferred embodiments of the present invention will now be described in further details. Other features and advantages of the present invention will become better understood with regard to the following detailed description and accompanying drawings where.

EMBODIMENT FOR CARRYING OUT THE INVENTION

Figure 1:
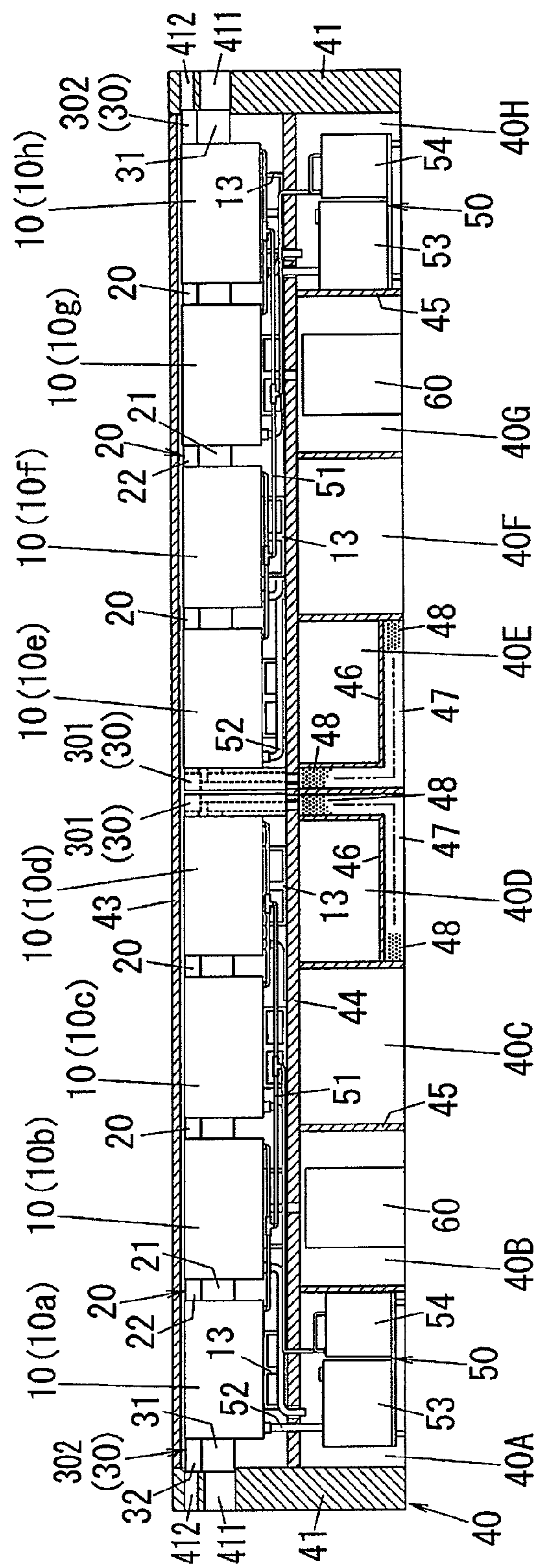
FIG. 1 is a partial sectional front view of the present embodiment.

As shown in FIG. 1, a plant cultivation device 1 described hereinafter, includes a plurality of boxes 10, connection units 20 and end section units 30. Each of the plurality of boxes 10 includes, in an inner space thereof, a cultivation chamber 11 for cultivating plants 2 and a light source housing chamber 12 for housing a light source 3. The plurality of boxes 10 are arranged in a line. Each connection unit 20 mutually connects two adjacent boxes of the plurality of boxes 10. Each end section unit 30 is mounted to an end section of a box 10 in an end of the line of the plurality of boxes 10 arranged in the line, and the end section of the box is unconnected to the connection unit 20. In other words, a box 10 is arranged between two connection units 20, or between one connection unit 20 and one end section unit 30. Each of the plurality of boxes 10 further includes a ventilation opening 111 for ventilation in the cultivation chamber 11 and a ventilation port 121 for air cooling in the light source housing chamber 12. The connection unit 20 and the end section unit 30 include first ventilation passages 21 and 31 respectively, through which air flows into the ventilation opening 111. In addition, the connection unit 20 and the end section unit 30 include second ventilation passages 22 and 32 respectively, through which air flows into the ventilation port 121.

The ventilation opening 111 includes a first ventilation opening 1111 provided in one wall of each box 10 in a direction in which the plurality of boxes 10 are arranged, and a second ventilation opening 1112 provided in the other wall of each box. The first ventilation opening 1111 is for introducing air into the cultivation chamber 11 through itself, and the second ventilation opening 1112 is for exhausting air from the cultivation chamber 11 through itself. The ventilation port 121 includes a first ventilation port 1211 opening in a wall 101 of each box 10 in which the first ventilation opening 1111 is provided, and a second ventilation port 1212 opening in a wall 102 of each box in which the second ventilation opening 1112 is provided. The first ventilation port 1211 is for introducing air into the light source housing chamber 12 through itself, and the second ventilation port 1212 is for exhausting air from the light source housing chamber 12 through itself.

It is preferable that the first ventilation passage 31 of the end section unit 30 has one end opening downward and the other end facing the ventilation opening 111, and the second ventilation passage 32 of the end section unit 30 has one end opening downward and the other end facing the ventilation port 121.

It is preferable that the plurality of boxes 10, the connection units 20 and the end section units 30 are incorporated into furniture. In this case, it is preferable that the first ventilation passage 31 of the end section unit 30 has one end opening downward and the other end facing the ventilation opening 111, and the second ventilation passage 32 of the end section unit 30 has one end opening downward and the other end facing the ventilation port 121. Moreover, it is preferable that furniture 40 includes therein a third ventilation passage 47 through which air flows between the furniture 40 and the end section unit 30, and a vent port 48 through which air flows between the furniture and outside of the furniture 40 in at least part of a wall surrounding the third ventilation passage 47.

Figure 2:
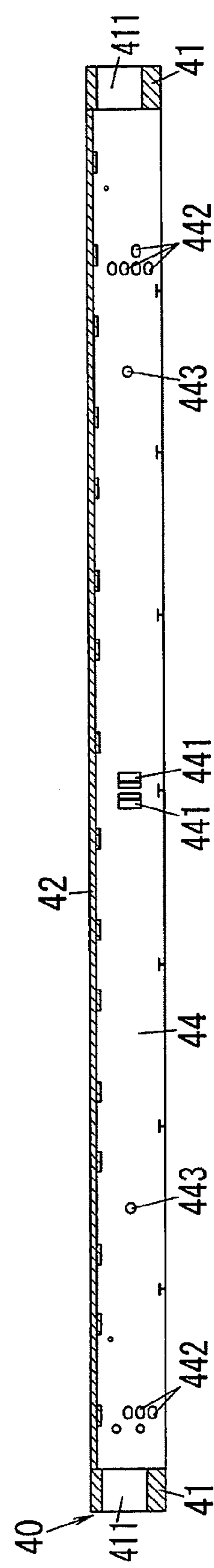
FIG. 2 is a horizontal sectional view of furniture used for the present embodiment.
Figure 3:
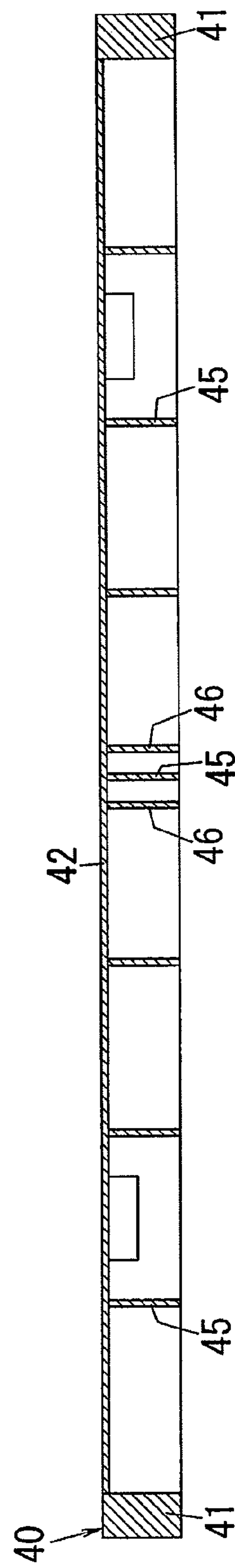
FIG. 3 is a horizontal sectional view of the furniture used for the present embodiment.
Figure 4:
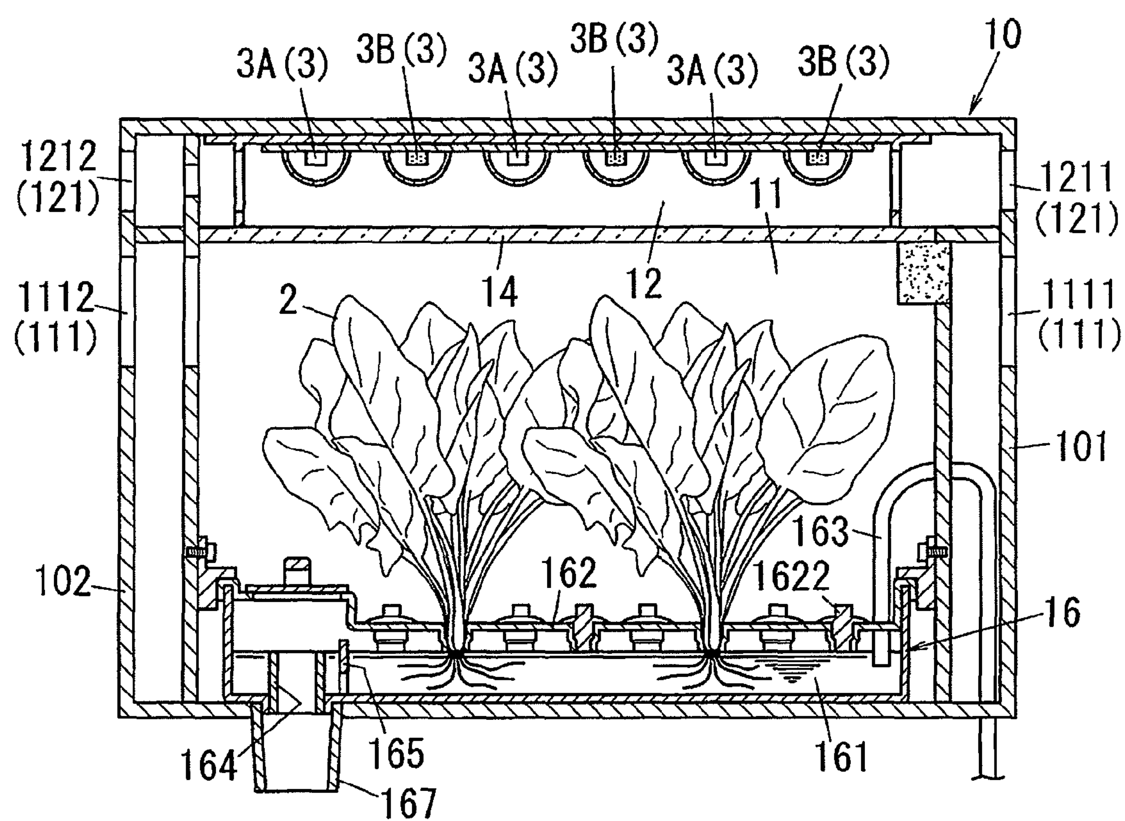
FIG. 4 is a sectional view of a box used for the present embodiment.

Composition of the embodiment will now be described in further details. As shown in FIG. 1 to FIG. 3, a plant cultivation device 1 described in the embodiment, includes a plurality of boxes 10, connection units 20 and end section units 30. As shown in FIG. 4, each box 10 includes a cultivation chamber 11 for cultivating plants 2 and a light source housing chamber 12 for housing a light source 3 in an inner space thereof. The plurality of boxes 10 are arranged in a line. Each connection unit 20 mutually connects two adjacent boxes 10. Each end section unit 30 is mounted to an end section of a box 10 in an end of the line of the plurality of boxes 10 arranged in the line, and the end section of the box 10 is unconnected to a connection unit 20.

Each of the plurality of boxes 10 further includes a ventilation opening 111 for ventilation in the cultivation chamber 11 and a ventilation port 121 for air cooling in the light source housing chamber 12. The connection unit 20 and the end section unit 30 include first ventilation passages 21 and 31 respectively, through which air flows into the ventilation opening 111. In addition, the connection unit 20 and the end section unit 30 include second ventilation passages 22 and 32 respectively, through which air flows into the ventilation port 121.

It is preferable that the ventilation opening 111 includes a first ventilation opening 1111 provided in one wall 101 of each box 10 in a direction in which the plurality of boxes 10 are arranged, and a second ventilation opening 1112 provided in the other wall 102 of each box 10. The first ventilation opening 1111 is for introducing air into the cultivation chamber 11 through itself, and the second ventilation opening 1112 is for exhausting air from the cultivation chamber 11 through itself.

It is preferable that the ventilation port 121 includes a first ventilation port 1211 opening in the wall 101 of each box 10 in which the first ventilation opening 1111 is provided, and a second ventilation port 1212 opening in the wall 102 of each box in which the second ventilation opening 1112 is provided. The first ventilation port 1211 is for introducing air into the light source housing chamber 12 through itself, and the second ventilation port 1212 is for exhausting air from the light source housing chamber 12 through itself.

Figure 5:
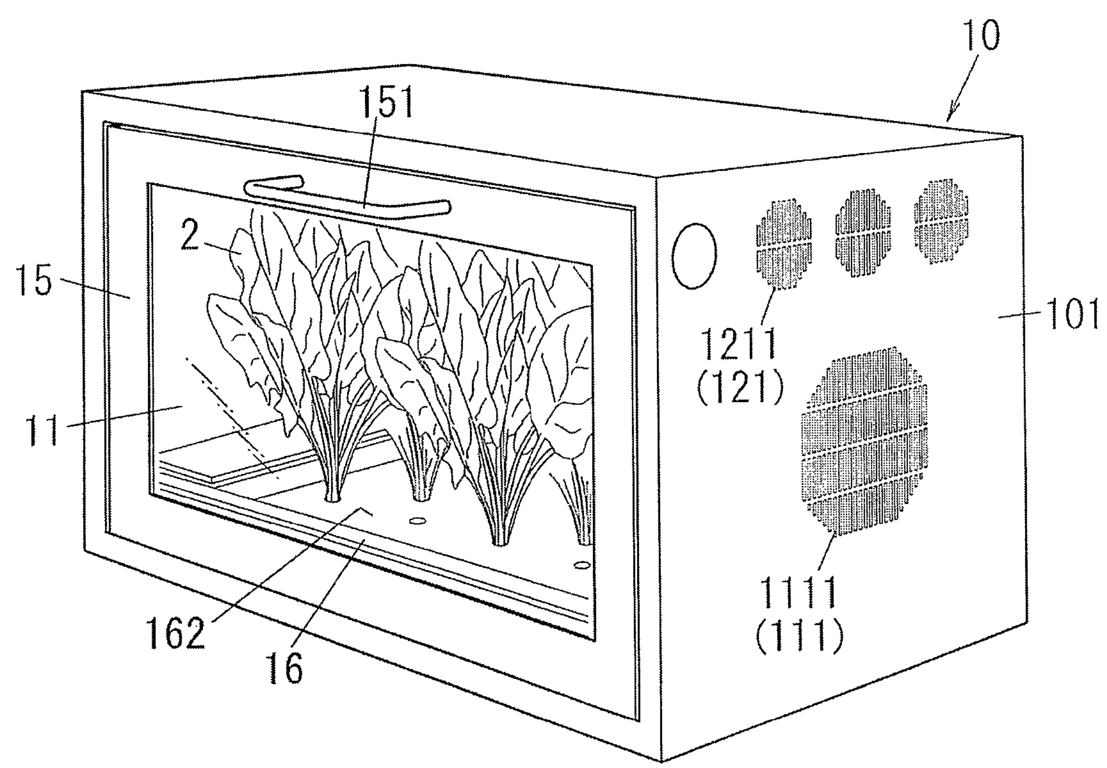
FIG. 5 is a perspective view of the box used for the present embodiment.
Figure 7:
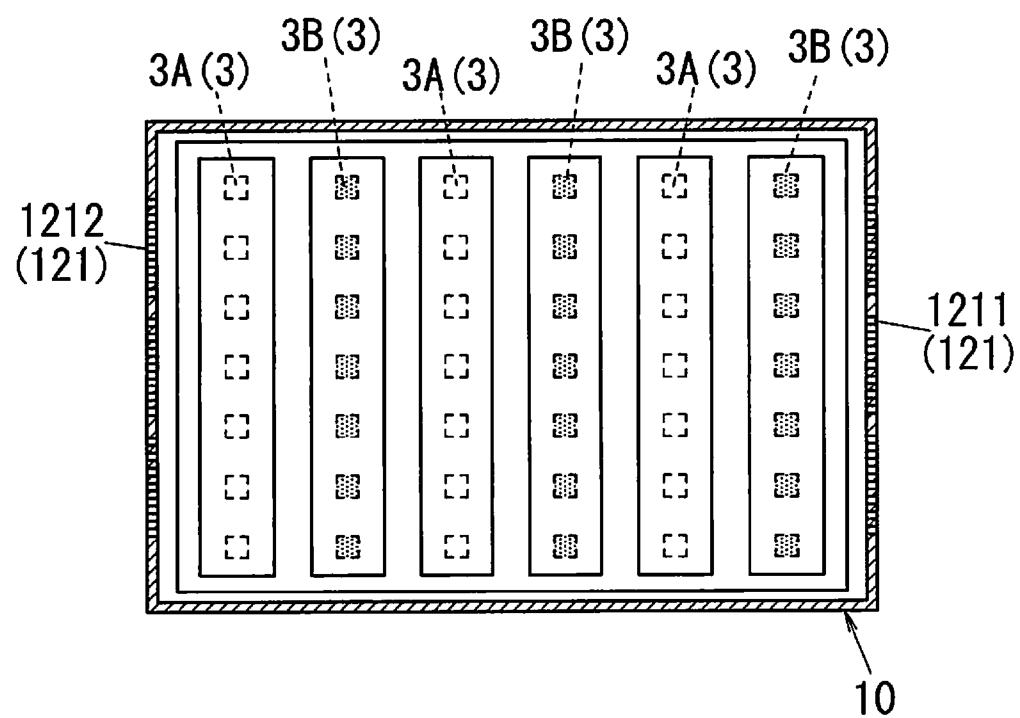
FIG. 7 is a plan view of a configuration example of a light source used for the present embodiment.

In FIG. 4, FIG. 5 and FIG. 7, the ventilation opening 111 in a right side wall 101 of each box 10 is used as the first ventilation opening 1111, and the ventilation port 121 in the right side wall 101 of each box 10 is used as the first ventilation port 1211. However, the ventilation opening 111 in a left side wall 102 of each box 10 may be used as the first ventilation opening 1111, and the ventilation port 121 in the left side wall 102 of each box 10 may be used as the first ventilation port 1211. That is, intake and exhaust air in each box 10 may be bidirectional.

Figure 8A:
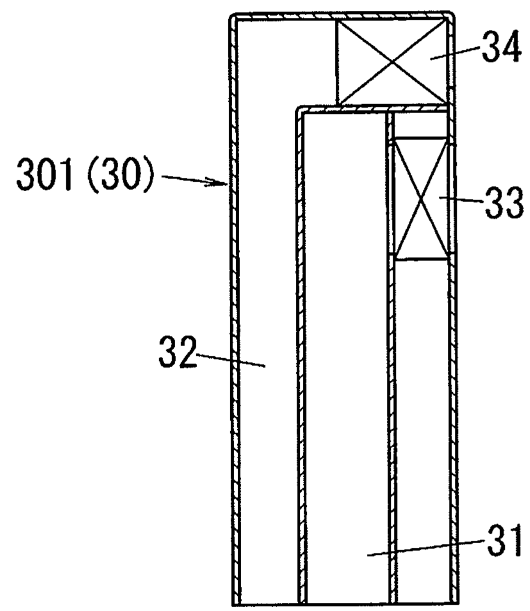
FIG. 8A is a sectional view of an end section unit used for the present embodiment.
Figure 8B:
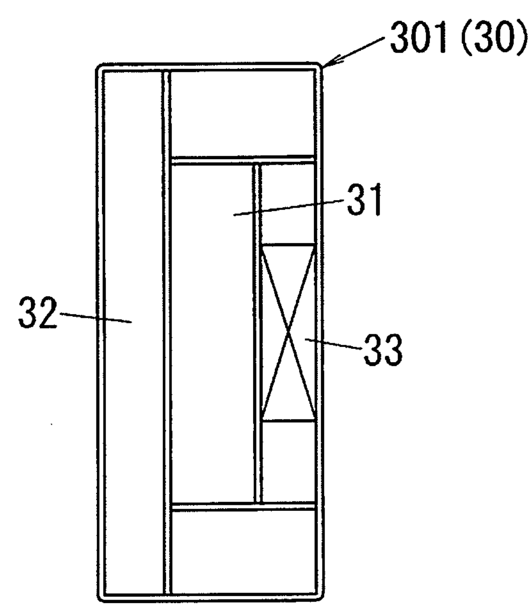
FIG. 8B is a bottom view of the end section unit used for the present embodiment.

As shown in FIG. 8A and FIG. 8B, it is preferable that the first ventilation passage 31 of the end section unit 30 has one end opening downward and the other end facing the ventilation opening 111, and the second ventilation passage 32 of the end section unit 30 has one end opening downward and the other end facing the ventilation port 121. Moreover, it is preferable that the plurality of boxes 10, the connection units 20 and the end section units 30 are incorporated into furniture 40 (refer to FIG. 1 to FIG. 3).

In composition that the plurality of boxes 10, the connection units 20 and the end section units 30 are incorporated into the furniture 40, the first ventilation passage 31 of the end section unit 30 has the one end opening downward and the other end facing the ventilation opening 111, and the second ventilation passage 32 of the end section unit 30 has the one end opening downward and the other end facing the ventilation port 121. Moreover, it is preferable that furniture 40 includes therein a third ventilation passage 47 through which air flows between the furniture 40 and the end section unit 30, and a vent port 48 through which air flows between the furniture 40 and outside of the furniture 40 in at least part of a wall surrounding the third ventilation passage 47.

The embodiments will hereinafter be described in details. The plant cultivation device 1 described hereinafter, may be used by installing on a rack such as a metal rack, however, it is preferable that the plant cultivation device is used by incorporating into the furniture 40 installed in an interior of a building as shown in FIG. 1. The furniture 40 incorporating the plant cultivation device 1 is illustrated as a rack with storage space in two rows up and down, however, it is not intended to be limited the furniture 40 in this form.

Each box 10 of the plant cultivation device 1 has a rectangular solid shape as shown in FIG. 4 and FIG. 5, and it is preferable that a size of a longest side thereof is approximately from 800 mm to 1000 mm. Consequently, when two boxes 10 are arranged in a direction along the longest side, two boxes, a connection unit 20 and end section units 30 can be installed if a space with a width of approximately 2000 mm is secured in room.

In FIG. 1, it is shown that the furniture 40 incorporates a set of four boxes 10 (10*a* to 10*d*) and another set of four boxes 10 (10*e* to 10*h*). In other words, the furniture 40 incorporates eight boxes 10 (10*a* to 10*h*) in total of two sets which are arranged. The plurality of boxes will hereinafter be described as simply box(es) 10 when each of the plurality of boxes is not distinguished, and described as box(es) 10*a* to 10*h* when each of the plurality of boxes is distinguished. As shown in FIG. 1 to FIG. 3, the furniture 40 has a box shape, and includes left and right side plates 41, a back plate 42 and a top plate 43. The furniture 40 has the composition on an assumption that it is installed on floor. The furniture 40 may be provided at the bottom surface (surface facing on floor) thereof with a floor plate while the furniture 40 without the floor plate is shown in the illustrated example.

The furniture 40 is provided with a shelf plate 44 for dividing an internal space of the furniture 40 into upper and the lower spaces between the bottom surface of the furniture 40 and the top plate 43. The boxes 10 are arranged in a space between the top plate 43 and the shelf plate 44, and put on spacers 13 placed on the shelf plate 44. A space between a bottom surface of each box 10 and the shelf plate 44 for piping described below is secured by a corresponding spacer 13. In the furniture 40, partition plates 45 divide a space provided below the shelf plate 44. The partition plates 45 are arranged at intervals, each of which is nearly equal to a size of each box 10. An upper end of each partition plate 45 is connected with a lower surface of the shelf plate 44, and a lower end thereof reaches the bottom surface of the furniture 40, and a back end thereof is connected with the back plate 42. Consequently, the partition plates 45 have a function of distributing a load against the shelf plate 44 from the boxes 10 to the bottom surface of the furniture 40 and the back plate 42.

Guiding plates 46 are respectively arranged on left and right sides of a partition plate 45 disposed at a central part in a horizontal direction of the furniture 40. The guiding plates 46 are provided for forming a space between the partition plate 45 and each of the guiding plates. The guiding plates 46 each is formed into an L-shape in cross section so that an upper part thereof is along the partition plate 45, and a lower part thereof is along the bottom surface of the furniture 40. The guiding plates 46 form spaces, each of which is surrounded by the partition plate 45 disposed at the central part in the horizontal direction of the furniture 40, the bottom surface of the furniture 40, the back plate 42 and each of the guiding plates 46. The spaces have L-shapes when viewed from the front of the furniture 40, and each has a function as the third ventilation passage 47. A large number of small holes are provided as the vent port 48 penetrating the back plate 42 in a front-back direction thereof, in each of regions of the back plate 42 facing the third ventilation passages 47. Each third ventilation passage 47 is made so that areas of any cross sections orthogonal to a direction in which air flows are mutually and approximately equal.

In the furniture 40 having the composition as described above, the space below the shelf plate 44 is divided into eight spaces 40A to 40H (refer to FIG. 1). In two spaces 40D and 40E of the eight divided spaces 40A to 40H, the third ventilation passages 47 and 47 are respectively provided as described above. In two spaces 40A and 40H at both ends of the furniture 40 in the horizontal direction, two water circulators 50 and 50 are respectively stored as described below. In two spaces 40B and 40G respectively adjacent to the two spaces 40A and 40H storing the water circulators 50 and 50, control devices 60 and 60 are respectively stored as described below. Although not shown, it is preferable that regarding the front of the furniture 40, a region thereof from the upper ends of the spacers 13 for supporting the boxes 10 to the lower end of the furniture 40 is covered with a door or a front plate.

The water circulators 50 are provided for circulating liquid to be applied to the plants 2 for cultivating the plants 2. The liquid is water or water containing nutrients (liquid nutrients). Notwithstanding nutrients is contained or not, a term of "water" or "liquid" will hereinafter be used.

The shelf plate 44 is provided with a plurality of holes (two vent holes 441 and 441, two sets of through holes 442 and two through holes 443 and 443) penetrating the shelf plate in the vertical direction (refer to FIG. 2). The two vent holes 441 and 441 having rectangular shapes are opened in parts of the shelf plate 44 corresponding to the third ventilation passages 47 and 47, respectively. The two sets of through holes 442 are provided in parts of the shelf plate 44 corresponding to the two spaces 40A and 40H storing the water circulators 50 and 50, respectively. The two through holes 443 and 443 are provided in parts of the shelf plate 44 corresponding to the two spaces 40B and 40G storing the control devices 60 and 60, respectively.

The through holes 442 are provided for introducing pipes 51 and 52 to be connected to the water circulators 50. One through hole 442 is assigned for the pipe 51 to send out water. Two or more through holes 442 are assigned for the pipes 52 to collect water, and the pipes 52 are respectively connected to the boxes 10. The two water circulators 50 and 50 are expected to be installed in the same direction with each other as shown in FIG. 1. Consequently, as shown in FIG. 2, positions of the through holes 442 corresponding to the space 40A and positions of the through holes 442 corresponding to the space 40H are left-right asymmetric with respect to the middle of the shelf plate 44 in a longitudinal direction thereof when viewed from the vertical direction.

On the other hand, in the two spaces 40B and 40G storing the control devices 60 and 60, the through holes 443 and 443 are provided one for each of the two spaces 40B and 40G for introducing cables (not shown) that connect the control devices 60 to electrical systems of the boxes 10. It is not intended to be limited the number and positions of the through holes 442 and 443 as shown in the illustrated example. The number and positions of the through holes can be appropriately decided.

Here, two through holes 411 and 412 having rectangular shapes are opened to be vertically arranged in each of the side plates 41 above the shelf plate 44. The lower through hole 411 is provided at a position facing the ventilation opening 111 of a box 10 placed on the shelf plate 44. The upper through hole 412 is provided at a position facing the ventilation port 121 of the box 10 placed on the shelf plate 44.

The composition of each box 10 will hereinafter be described with FIG. 4 and FIG. 5. Each box 10 is provided in the inner space thereof with the cultivation chamber 11 for housing the plants 2 being a target to be cultivated, and the light source housing chamber 12 for housing the light source 3 irradiating the plants 2 with light. The cultivation chamber 11 is separated from the light source housing chamber 12 by a partition member 14 having light transmitting property. A door 15 that can be opened and closed is provided in part of the front of each box 10 corresponding to the cultivation chamber 11. It is transparent in at least part of the door 15. It is made so that the internal condition of the cultivation chamber 11 can be observed through the closed door 15. The boxes 10 and the doors 15 are made of, for example, metal plate or synthetic resin such as acrylic resin.

The composition of the door 15 is expected to be vertically opened and closed, and the lower end section of the door is mounted with a hinge to a corresponding box 10. For the reason above, a knob 151 is provided at an upper end of an outside surface of the closed door 15. As the composition of the door 15, one of side end sections of the door 15 may be mounted with a hinge to the corresponding box 10. In this case, the knob 151 is provided at the other of the side end sections of the door 15 that is not mounted with the hinge.

The main objects to be cultivated in the boxes 10 are leaf vegetables such as lettuces, leaf herbs, Japanese mustard spinach and spinach, however, flowering plants as the plants 2 may be also cultivated in the boxes 10. The boxes 10 are provided for the purpose of cultivating the plants 2 as hydroponics without the use of soil. For the reason above, a cultivation container 16 is installed at a lower part of the cultivation chamber 11 for positioning the plants 2 and for applying water and nutrients to the plants 2.

Figure 6A:
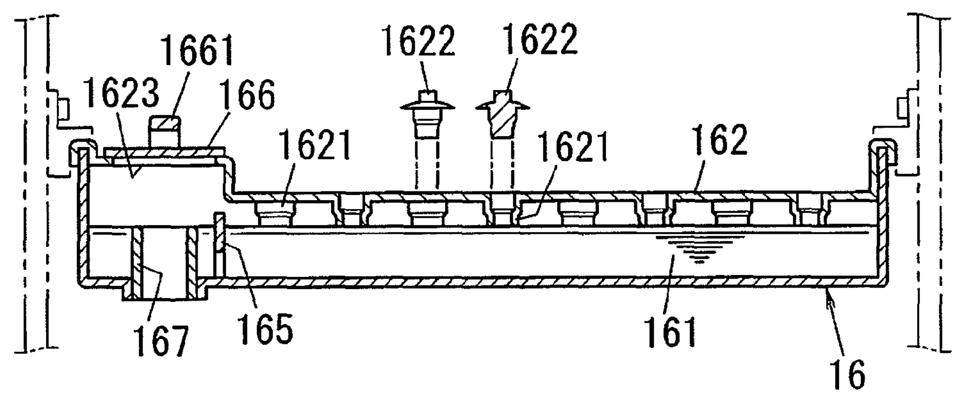
FIG. 6A is a sectional view of a cultivation container used for the present embodiment.
Figure 6B:
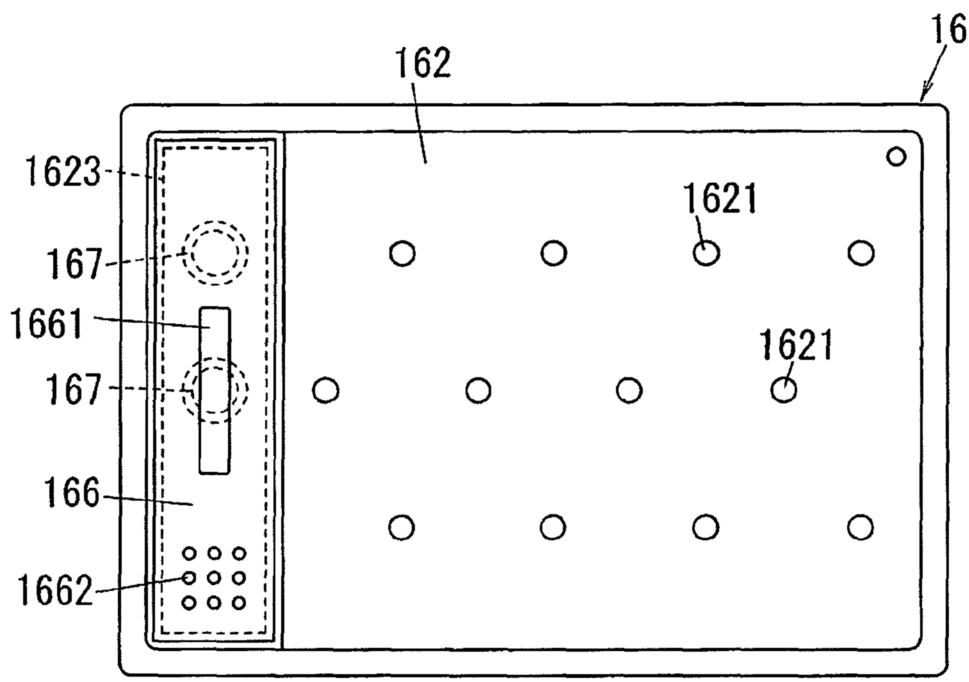
FIG. 6B is a plan view of the cultivation container used for the present embodiment.

The cultivation container 16 includes a hydroponics tank 161 and a cover plate 162 as shown in FIG. 6A and FIG. 6B. The hydroponics tank 161 is a rectangle container, of which a top surface is opened in a rectangular shape. The cover plate 162 covers a top surface of water supplied in the hydroponics tank 161. The cultivation container 16 is stored in a corresponding box 10 so that a longitudinal direction of the hydroponics tank 161 matches a longitudinal direction of the corresponding box 10. Water containing nutrients to be applied to the plants 2 is supplied in the hydroponics tank 161. The cover plate 162 includes a plurality of insertion tubes 1621 supporting the plants 2. The plants 2 are positioned by being inserted in any of the plurality of insertion tubes 1621. Roots of the plants 2 are soaked in water below the cover plate 162. Stems and leaves of the plants 2 grow above the cover plate 162. The cover plate 162 is fixed to the box 10 in dismountable style.

Regarding the shape of the cover plate 162, it is made so that top surfaces of parts of the insertion tubes 1621 are vertically below an upper end of an outer wall of the hydroponics tank 161. Caps 1622 can be respectively inserted in the insertion tubes 1621. The contamination of foreign substances into water in the hydroponics tank 161 can be prevented by inserting caps 1622 in insertion tubes 1621 in which the plants 2 are not inserted. It is preferable that the cover plate 162 and the caps 1622 are made of light shielding material. If the cover plate 162 and the cap 1622 have light shielding properties, light irradiation to water supplied in the hydroponics tank 161 is prevented. Consequently, generation of algae and decomposition of nutrients contained in water are reduced.

One end section of a water injection pipe 163 (refer to FIG. 4) is introduced into one end section of the hydroponics tank 161 (a right end section in FIG. 4) in the longitudinal direction thereof through the cover plate 162. The water injection pipe 163 is introduced into the cultivation chamber 11 through a lower wall of the box 10. The water injection pipe 163 is bent like an inverse U-shape so that water is injected at a lower part of the hydroponics tank 161 after passing through a position above the surface of water introduced in the hydroponics tank 161. Namely, the water injection pipe 163 is formed so that water passes through the position above the surface of water stored in the hydroponics tank 161, and accordingly the water stored in the hydroponics tank 161 does not flow back, and water is injected at the lower part of the hydroponics tank 161 so that an end of the water injection pipe 163 from which water is supplied into the hydroponics tank 161 is not exposed.

A drain tube 164 and a plate-shaped partition 165 are provided at the other end section of the hydroponics tank 161 in the longitudinal direction thereof (a left end section in FIG. 4). An upper part of the drain tube 164 is arranged in a space surrounded by the outer wall of the hydroponics tank 161 and the partition 165. An upper end of the partition 165 is located below the upper end of the outer wall of the hydroponics tank 161. An upper surface of the drain tube 164 is located below the upper end of the partition 165. The partition 165 is provided in the lower part thereof below the upper surface of the drain tube 164 with a through-hole. Therefore, a level of the water in the hydroponics tank 161 is equal on two sides of the partition 165 (a right side and a left side in FIG. 4). Consequently, when water is supplied at an appropriate flow rate in the hydroponics tank 161, surplus water is drained from the drain tube 164, and the level of water in the hydroponics tank 161 is maintained at a height of the upper surface of the drain tube 164.

The cover plate 162 is provided in part thereof corresponding to the drain tube 164 with a maintenance port 1623. The maintenance port 1623 is covered with a maintenance port lid 166. The maintenance port lid 166 is provided with a handle 1661 for gripping when opened and closed, and further provided with air holes 1662 through which air flows into the inside of the cultivation container 16. A lower end section of the drain tube 164 is connected to the hydroponics tank 161. A lower wall of the hydroponics tank 161 is connected to a drainpipe 167 through which water drained from the lower end of the drain tube 164 is derived to the outside of the box 10.

The two walls 101 and 102 of each box 10 in the longitudinal direction thereof are respectively provided in parts thereof corresponding to the cultivation chamber 11 with the ventilation openings 111 and 111, respectively. One of the left and right ventilation openings 111 and 111 in FIG. 4 functions as the first ventilation opening 1111 for introducing air into the cultivation chamber 11, and the other ventilation opening 111 functions as the second ventilation opening 1112 for exhausting air from the cultivation chamber 11. Any of the left and right ventilation openings 111 in the figure may be the first ventilation opening 1111, but here, the right ventilation opening 111 is regarded as the first ventilation opening 1111 as a matter of convenience. The composition of adjusting air environment in the cultivation chamber 11 through the ventilation opening 111 will be described below.

Here, a light emitting diode (LED) is used for the light source 3 stored in the light source housing chamber 12. The light source 3 in the illustrated example has the composition that a plurality of LEDs 3A emitting white color light and a plurality of LEDs 3B emitting red color light are arranged on a substrate. First blocks are arranged in lines, each of which includes LEDs 3A arranged in a line, and second blocks are arranged in lines, each of which includes LEDs 3B arranged in a line. The first blocks and the second blocks are alternately arranged.

A direction in which the LEDs 3A and the LEDs 3B are arranged in the lines may be in the longitudinal direction of the box 10 or in a direction orthogonal to the longitudinal direction of the box 10. It is not essential that the LEDs 3A and the LEDs 3B are arranged in the lines.

The LEDs 3A emitting white color light each, for example, is configured by an LED chip emitting blue color light and phosphor which converts blue color light into yellow color light. The LEDs 3A each has a configuration in which the LED chip is covered with a color conversion member containing the phosphor, and part of blue color light is converted into yellow color light, and accordingly white color light is taken out by mixing of the remaining blue color light with the yellow color light. It is preferable that the LEDs 3B emitting red color light each has a peak emission wavelength near 660 nm. Light within the wavelength region is efficiency absorbed by phytochrome of the plants 2, so that photosynthesis of the plants 2 is activated and growth of the plants 2 is promoted. The light source 3 may be not the LEDs 3A and 3B but another electric light source such as a fluorescent lamp.

The two walls 101 and 102 of the box 10 in the longitudinal direction thereof are respectively provided in the parts thereof corresponding to the light source housing chamber 12 with the ventilation ports 121 and 121, respectively. One of the left and right ventilation ports 121 and 121 in FIG. 4 functions as the first ventilation port 1211 for introducing air into the light source housing chamber 12, and the other ventilation port 121 functions as the second ventilation port 1212 for exhausting air from the light source housing chamber 12. Consequently, the heat generated by the light source 3 is exhausted from the light source housing chamber 12 by air flowing between the first ventilation port 1211 and the second ventilation port 1212, and accordingly the light source 3 is cooled by the air.

Any of the left and right ventilation ports 121 in FIG. 4 may be the first ventilation port 1211, however, the ventilation port 121 provided in a wall (the wall 101 or the wall 102) in which the first ventilation opening 1111 is provided is regarded as the first ventilation port 1211. In other words, the first ventilation opening 1111 and the first ventilation port 1211 are provided in the right side wall 101 of the box 10, and the second ventilation opening 1112 and the second ventilation port 1212 are provided in the left side wall 102 of the box 10 in the illustrated example.

Here, the plurality of boxes 10 as described above are incorporated into the furniture 40. The furniture 40 shown in the present embodiment may incorporate eight boxes 10. Two adjacent boxes 10 are connected with each other by the connection unit 20.

Each connection unit 20 includes a first ventilation passage 21 through which air flows into the ventilation opening 111 provided in a box 10, and a second ventilation passage 22 through which air flows into the ventilation port 121 provided in the box 10. When two adjacent boxes 10 are connected with each other by the connection unit 20, air flows between the ventilation openings 111 and 111 provided in the two adjacent boxes 10 through the first ventilation passage 21, and air flows between the ventilation ports 121 and 121 provided in the two adjacent boxes 10 through the second ventilation passage 22. Namely, air in the cultivation chamber 11 and the light source housing chamber 12 provided in each box 10 flows through the connection unit 20 without mutually mixing of the air as well.

In two boxes 10 at both ends of the plurality of boxes 10 arranged in the line, two end section units 30 and 30 are respectively connected to the wall 101 of one of the two boxes 10, unconnected to a connection unit 20, and the other wall 102 of the other of the two boxes 10, unconnected to a connection unit 20. In the example shown in FIG. 1, in boxes 10*a* and 10*d* at both ends of four boxes 10*a* to 10*d* connected, two end section units 30 and 30 are respectively connected to the wall 102 of the box 10*a* and the wall 101 of the box 10*d*. In boxes 10*e* and 10*h* at both ends of four boxes 10*e* to 10*h* connected, two end section units 30 and 30 are respectively connected to the wall 102 of the box 10*e* and the wall 101 of the box 10*h*. Namely, the end section units 30 are provided four in total.

In particular, two first end section units 301 and 301, and two second end section units 302 and 302 are provided as the end section units 30 in total of four. The first end section units 301 and 301 are respectively connected to two boxes 10*d* and 10*e* arranged on a central side of eight boxes 10*a* to 10*h*. The second end section units 302 and 302 are respectively connected to two boxes 10*a* and 10*h* arranged at both ends of the eight boxes 10.

Each of the end section units 30 includes a first ventilation passage 31 through which air flows into the ventilation opening 111, and a second ventilation passage 32 through which air flows into the ventilation port 121 in the same way as the connection unit 20. Namely, air in the cultivation chamber 11 and the light source housing chamber 12 provided in each box 10 flows through the end section unit 30 without mutually mixing of the air as well.

Each first end section unit 301 includes the first ventilation passage 31 and the second ventilation passage 32 as shown in FIG. 8A and FIG. 8B. The first ventilation passage 31 has one end opening downward and the other end facing the ventilation opening 111, and the second ventilation passage 32 has one end opening downward and the other end facing the ventilation port 121. The first ventilation passage 31 installs a ventilation device 33 inside thereof, and the second ventilation passage 32 installs a ventilation device 34 inside thereof. The ventilation device 33 includes an air blower for ventilation in the cultivation chamber 11 by taking the outside air into the first ventilation passage 31. The ventilation device 34 includes an air blower (not shown) for ventilation in the light source housing chamber 12 by taking the outside air into the second ventilation passage 32.

Figure 9:
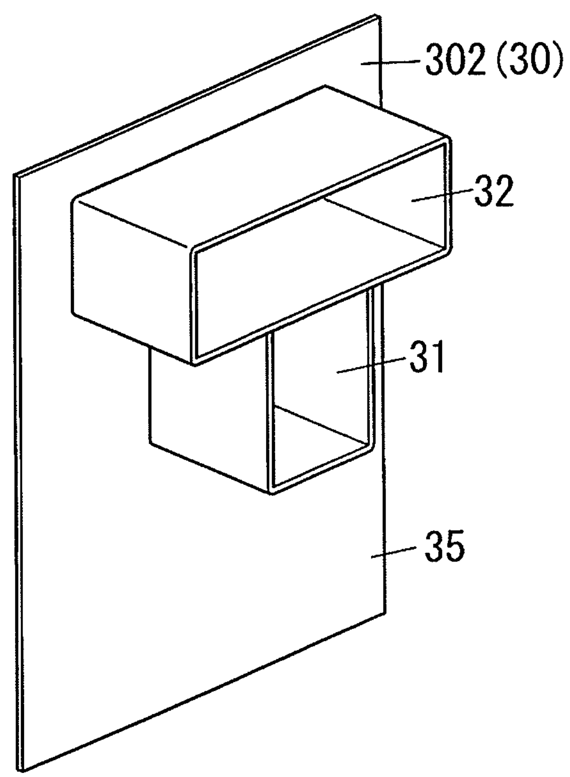
FIG. 9 is a perspective view of another end section unit used for the present embodiment.

Each second end section unit 302 includes a basal plate 35 to be mounted on the wall (101 or 102) of a corresponding box 10 as shown in FIG. 9. Regarding each second end section unit 302, a member configuring the first ventilation passage 31 is formed into a rectangular tube shape surrounding the ventilation opening 111, and a member configuring the second ventilation passage 32 is formed into a rectangular tube shape surrounding the ventilation port 121. Each second end section unit 302 is formed in a way of connecting the members configuring the first ventilation passage 31 and the second ventilation passage 32 to the basal plate 35.

As shown in FIG. 1, the furniture 40 incorporates the boxes 10, the connection units 20 and the end section units 30. The furniture 40 includes the third ventilation passages 47 inside thereof, each through which air flows between ends of the first ventilation passage 31 and the second ventilation passage 32, which are opened downward in a corresponding first end section unit 301. The furniture 40 includes vent ports 48 that are provided in at least part of a wall surrounding each of the third ventilation passages 47, and air flows between the furniture and the outside of the furniture 40 through the vent ports 48. Each vent port 48 is configured by a plurality of through holes, each of which has a small diameter. Moreover, each vent port 48 is provided in a member that is the back plate 42 of the furniture 40, as part of the wall surrounding a corresponding third ventilation passage 47.

The vent holes 441 and 441 are provided in the shelf plate 44 of the furniture 40, and respectively correspond to the first end section unit 301 connected to the box 10*d*, and the first end section unit 301 connected to the box 10*e*. Through each of the vent holes 441, air flows between the first ventilation passage 31 and the third ventilation passage 47, and between the second ventilation passage 32, and the third ventilation passage 47. Each third ventilation passage 47 is shared with the first ventilation passage 31 and the second ventilation passage 32, however, each vent hole 441 may be internally separated into two holes to correspond to the first ventilation passage 31 and the second ventilation passage 32, respectively.

The furniture 40 is further provided in each of the left and right side plates 41 and 41 with the through holes 411 and 412. Air flows between the first ventilation passage 31 provided in the second end section unit 302 and the outside of the furniture 40 through each through hole 411. Air flows between the second ventilation passage 32 provided in the second end section unit 302 and the outside of the furniture 40 through each through hole 412. The through holes 411 and 412 are provided to correspond to the first ventilation passage 31 and the second ventilation passage 32, respectively, in the same way as the vent holes 441.

According to the configuration described above, when the ventilation devices 33 and 33 and the ventilation devices 34 and 34 are operated, air is introduced into the third ventilation passages 47 and 47 from the outside of the furniture 40 through the vent ports 48 (four ports in total) provided in the furniture 40. Then, air is supplied to the boxes 10*d* and 10*e* through the first end section units 301 and 301. The air supplied to the boxes 10*d* and 10*e* is supplied to the other boxes 10 through the connection units 20. Air is exhausted to the outside of the furniture 40 through the through holes 411 and 411 and the through holes 412 and 412 when reached the second end section units 302 and 302.

Consequently, air required for growth of the plants 2 ventilates the cultivation chambers 11 provided in each box 10. Further, air flows also in the light source housing chambers 12 provided in each box 10, so that the light sources 3 are cooled. Air whose temperature is increased due to the heat from the light sources 3 is exhausted through the through holes 411 and 411 and the through holes 412 and 412 of the furniture 40 without being stored in the furniture 40.

In the example of configuration described above, air which is introduced through the third ventilation passages 47 and 47 provided in the furniture 40 is supplied to the boxes 10*d* and 10*e*. However, air which is introduced through the through holes 411 and 411 and the through holes 412 and 412 provided in the side plates 41 and 41 of the furniture 40 may be supplied to the boxes 10*a* and 10*h*. In this case, directions in which the ventilation devices 33 and 33 and the ventilation devices 34 and 34 blow air may be reversed. Alternatively, the ventilation devices 33 and 34 may be provided in each second end section unit 302 instead of the ventilation devices 33 and 34 being provided in each first end section unit 301.

Here, water is supplied from the water circulator 50 through the pipes 51 into the hydroponics tank 161 provided in the cultivation container 16 of each box 10, and collected into the water circulator 50 through the pipes 52 from the hydroponics tank 161. The water circulators 50 each includes a tank 53 for storing water and a water supply apparatus 54 to supply water stored in the tank 53. The water circulators 50 having this configuration are respectively provided at left and right end sections of the furniture 40 in the illustrated example.

The water injection pipes 163 (refer to FIG. 4), each of which is provided in a corresponding box 10, are mutually connected through one pipe 51, and the one pipe 51 is connected to the water supply apparatus 54. The drainpipes 167, each of which is provided in a corresponding box 10, are respectively connected to the pipes 52, and water is collected into the tank 53 through the pipes 52. The plurality of through holes 442 are provided in the shelf plate 44 of the furniture 40 as described above. The pipe 51 is passed through one of the plurality of through holes 442. The pipes 52 are respectively passed through the others of the plurality of through holes 442.

The pipes 52 are inserted in an upper end section of the tank 53, and water injected from the pipes 52 into the tank 53 falls onto a surface of water stored in the tank 53. Accordingly, water stored in the tank 53 is mixed with air. Because water injected into the hydroponics tank 161 is circulated by the water circulator 50, by means of mixing air into water in the tank 53, propagation of anaerobic bacteria is inhibited, which contributes to reduction of factors inhibiting growth of the plants 2.

Here, the water supply apparatus 54 also functions as a chiller for cooling water stored in the tank 53 to adjust temperature of water to be injected into the hydroponics tank 161. Because the water supply apparatus 54 is used in order to decrease temperature of water to be injected into the hydroponics tank 161, the hydroponics tank 161 is further provided with a heater (not shown) such as a sheath heater, which is capable of being soaked in water, in order to increase temperature of water injected into the hydroponics tank 161. Consequently, it is possible to control water temperature in the hydroponics tank 161 with the water supply apparatus 54 and the heater. A temperature sensor (not shown) is also essential to measure temperature of water stored in the hydroponics tank 161.

The control devices 60 and 60 installed in the furniture 40 control lighting states of the light source 3, operations of the ventilation devices 33 and 33 and the ventilation devices 34 and 34, operations of the water supply apparatuses 54 and 54, and the like. The control devices 60 each is realized by executing a program with a dedicated device including a microcomputer as a major hardware element, or a general purpose device such as a personal computer. Cultivation environment for the plants 2 is monitored by a variety of sensors arranged in each box 10.

These kinds of sensors, for example, monitor room temperature and humidity in the cultivation chamber 11, temperature of water stored in the hydroponics tank 161, and presence/absence of a person in the vicinity of the boxes 10. It is a reason of monitoring presence/absence of a person that, for example, only the LEDs 3B emitting red color light which are appropriate for cultivation of the plants 2 are lighted for a period when there is nobody, and the LEDs 3A emitting white color light are additionally lighted in order to help confirming condition of the plants 2 for a period when there is someone.

The programs executed by the control devices 60 may be changed depending on a type of the plants 2. The control devices 60 have the programs that correspond to plural types of the plants 2, and the composition that a user can select a desired program. However, because the programs may be updated, it is preferable that the control devices 60 have the configuration that the programs can be downloaded through an electric communication line as the Internet. Because it is not essential for the control devices 60 to memorize many programs if the programs can be updated, memory resources can be reduced. Even in case of being developed a new type of the plants 2, it can be controlled under a program which is suitable for the new type of the plants 2.

Although not shown, a growth state of the plants 2 may be monitored by arranging a TV camera in the cultivation chamber 11. In case of arranging the TV camera, it is possible to monitor the growth state of the plants 2, adjust the lighting state of each light source 3, and control the ventilation devices 33 and 33 and the ventilation devices 34 and 34 or the like with a terminal device which communicates with the control devices 60 through an electric communication line. This type of terminal device may be a personal computer, a smart phone, a tablet terminal or the like.

The present embodiment described above is one example according to the present invention, and the present invention is not limited to the present embodiment described above. Even in an embodiment other than the present embodiment, various modifications should be possible depending on designs or the like, as long as the embodiment is within a scope of a technical idea according to the present inventions.

The configuration on an assumption of a hydroponic culture was described above as an example, however, it may be changed to a configuration on an assumption of a soil culture. In addition, in the configuration example described above, only an operation of taking air from the outside into the cultivation chamber 11 is performed, however, an operation of circulating air inside of the cultivation chamber 11 may be additionally performed to increase carbon dioxide concentration by shutting off intake of air from the outside. In this case, because the operation of taking air from the outside into the cultivation chamber 11 and the operation of circulating air inside of the cultivation chamber 11 need to be switched at an appropriate timing, the carbon dioxide concentration may be managed with a carbon dioxide sensor. Furthermore, the light source 3 is not always arranged above the cultivation chamber 11, but may be arranged on a side of the cultivation chamber 11, and a distance between the plants 2 and the light source 3 may be adjustable. Moreover, the water circulators 50 or the control devices 60 may be configured to be integrated with the boxes 10, instead of being provided separately from the boxes 10.

Figure 10:
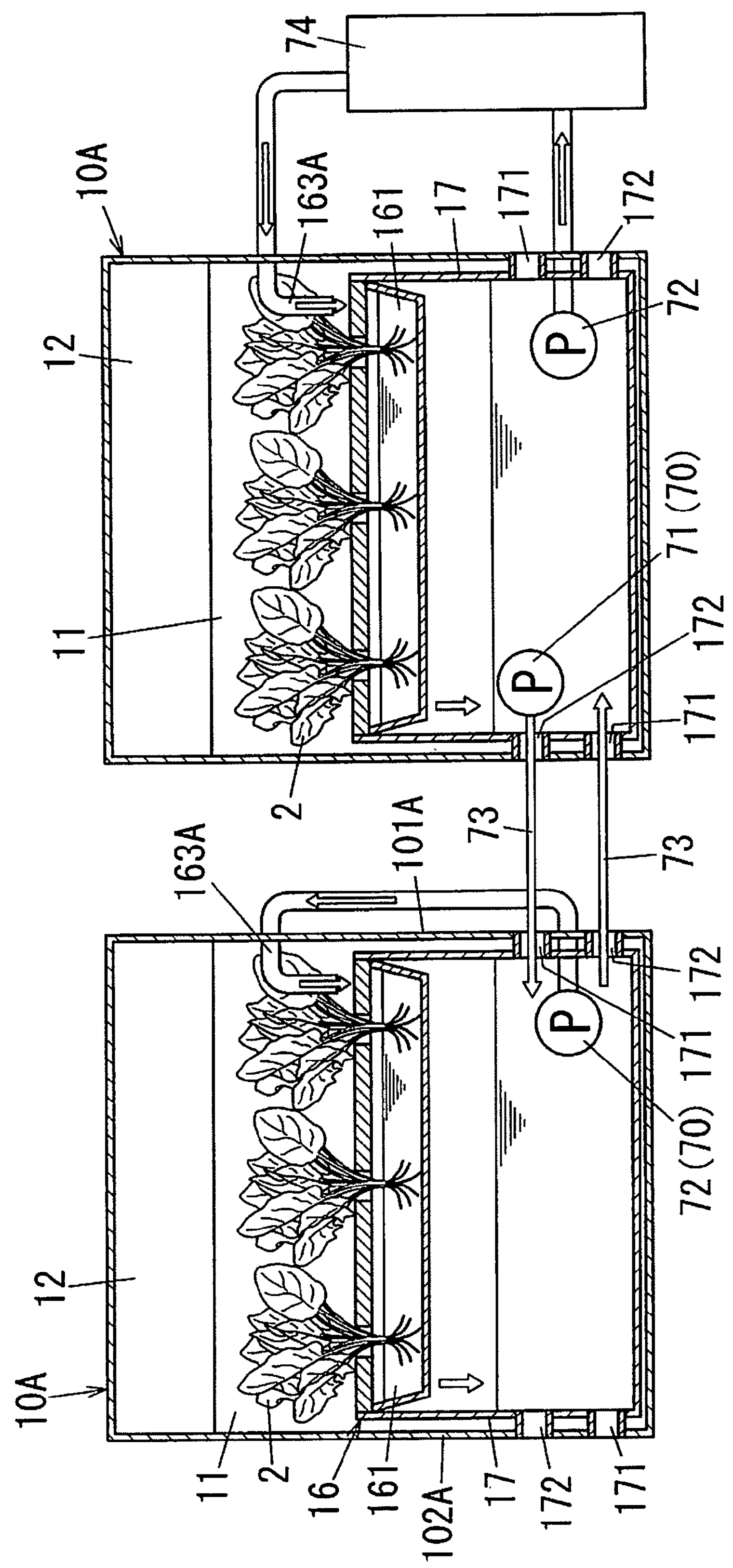
FIG. 10 is a diagram illustrating another configuration example of the present embodiment.

FIG. 10 shows a configuration example in case that components equivalent to the water circulators 50 are integrated with the boxes 10. Namely, in the configuration example shown in FIG. 10, the liquid to be applied to the plants 2 is stored inside of each of boxes 10A. Regarding the configuration, it is preferable that each box 10A further includes therein a reservoir 17. In this case, it is preferable that the plant cultivation device 1 further includes therein a sending apparatus 70. The reservoir 17 is provided separately from the cultivation chamber 11 and the light source housing chamber 12, and reserves liquid to be applied to the plants 2. The sending apparatus 70 sends the liquid from the reservoir 17 of one box 10A of two or more boxes 10A, and circulates the liquid in a path through the reservoir 17 of the other box 10A of the two or more boxes 10A.

It is preferable that each box 10 includes an inflow port 171 taking the liquid from the outside into its own reservoir 17, and an outflow port 172 taking the liquid reserved in its own reservoir 17 out of the each box 10A. In this case, it is preferable that the sending apparatus 70 has a function of circulating the liquid between more than one box 10A through inflow ports 171 and outflow ports 172 thereof, in which reservoirs 17 of the more than one box 10A are mutually connected through the inflow ports 171 and the outflow ports 172 thereof. It is preferable that the sending apparatus 70 includes submersible pumps 71 and 72 arranged in the reservoir 17, and an ejector 75 configured to mix air to the liquid in a channel flowing the liquid.

The configuration example is shown in FIG. 10, in which two boxes 10A are horizontally arranged. Each box 10A has the same configuration as the box 10 shown in FIG. 4, however, each box 10A is provided in a lower part thereof with the reservoir 17 for reserving liquid (hereinafter refer to as "water", which may be liquid nutrients containing nutrients). In other words, while the box 10 shown in FIG. 4 is provided in the lower part thereof with the cultivation container 16 for applying the water to the plants 2, each box 10 in the configuration example shown in FIG. 10 is provided in a middle section in a vertical direction thereof with the cultivation container 16.

Each box 10 is provided with two inflow ports 171 taking the water from the outside into its own reservoir 17 and two outflow ports 172 taking the water out of its own reservoir 17. In the illustrated example, a set of an inflow port 171 and an outflow port 172 is provided in each of left and right sides walls 101A and 102A of each box 10A. An inflow port 171 is provided above an outflow port 172 in the right side wall 101A, and an outflow port 172 is provided above an inflow port 171 in the left side wall 102A.

According to the configuration, in case that two boxes 10A are horizontally arranged, the outflow port 172 of one of two adjacent boxes 10A and 10A faces the inflow port 171 of the other of the two adjacent boxes 10A and 10A. Consequently, it is possible to connect the outflow port 172 and the inflow port 171 of the two adjacent boxes 10A and 10A with each other, through two linear pipelines 73. Among the two inflow ports 171 and the two outflow ports 172 provided in each box 10A, one inflow port 171 and one outflow port 172 without flowing the water are closed by caps (not shown) being mounted therein.

The pump 71 as one of members configuring the sending apparatus 70 is provided to circulate the water between the reservoirs 17 provided respectively in the two boxes 10A. The pump 71 is a submersible pump arranged in the reservoir 17, and may be provided in each box 10A. However, the pump 71 is not always an accessory for each box 10A, but may be appropriately provided as necessary. The pump 71 is arranged to send the water stored in the reservoir 17 outside of the box 10A through the outflow port 172.

Each box 10A is further provided with the pump 72 as one of members configuring the sending apparatus 70 to send the water from the reservoir 17 without passing through the outflow port 172. The pump 72 is a submersible pump, and the water pumped from the reservoir 17 with the pump 72 is sent inside or outside of the box 10A. In the illustrated example, the water pumped from the reservoir 17 with the pump 72 is once taken outside of the box 10A, and then backed to inside of the box 10A. The water is eventually supplied to the hydroponics tank 161 of the cultivation container 16. The water is sent from the pump 72 into the hydroponics tank 161 through a water injection pipe 163A. Similarly to the pump 71, the pump 72 is not always an accessory for each box 10A, but may be appropriately provided as necessary.

The box 10A on a right side of the illustrated example is provided in a way of the water injection pipe 163A with a chiller 74 for cooling the water. The chiller 74 is configured to adjust a temperature of the water pumped from the reservoir 17 with the pump 72, and inject the water into the hydroponics tank 161. Consequently, it is possible to manage temperature of the water in the hydroponics tank 161 in which the plants 2 are soaked, and maintain the water in the hydroponics tank 161 at an appropriate temperature. The water injected in the hydroponics tank 161 is collected into the reservoir 17 through the drainpipe 167 (refer to FIG. 4), and sent to the reservoir 17 of the other box 10A with the pump 71. Consequently, temperature of the water in the reservoirs 17 is almost homogenized if the number of the boxes 10A is several. The single chiller 74 is provided for the two boxes 10A in the illustrated example, however, chillers 74 may be provided so as to be respectively attached to boxes 10A.

Figure 11A:
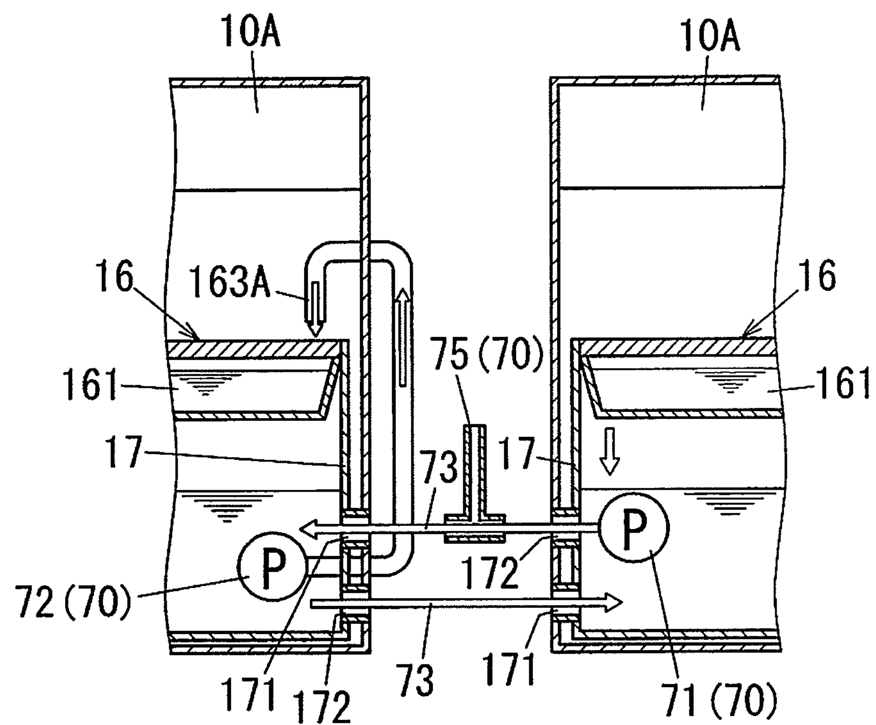
FIG. 11A and FIG. 11B are diagrams of an essential part illustrating still another configuration example of the present embodiment.
Figure 11B:
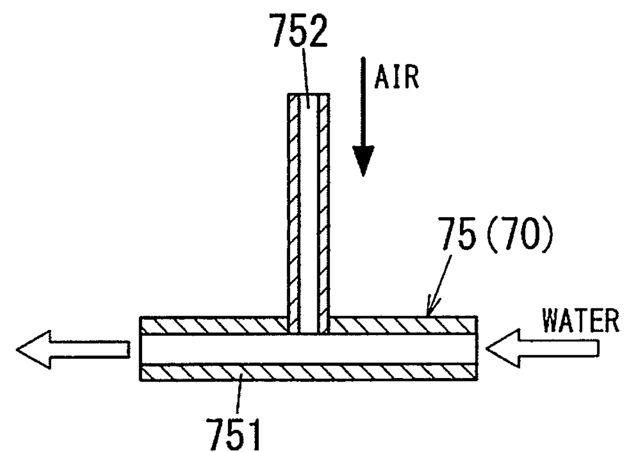

As shown in FIGS. 11A and 11B, the ejector 75 may be provided in the pipeline 73 which connects the outflow port 172 and the inflow port 171 between the two adjacent boxes 10A and 10A in order to increase an amount of oxygen (air) dissolving in water of the hydroponics tank 161. As shown schematically in FIG. 11B, the ejector 75 has a configuration that an intake port 752 is provided for taking air into a pipeline 751 in which the water flows. In other words, the ejector is configured so that when the water is made to flow in the pipeline 751, negative pressure is generated, and thereby air is introduced through the intake port 752, and the air introduced through the intake port 752 is then mixed with the water, and accordingly the amount of oxygen (air) dissolving in the water is increased. FIG. 11B merely schematically shows a principle of the ejector 75, however, in fact, the ejector 75 has the configuration that air is stirred by disturbing a flow of water so that the air is easily dissolved in the water. The ejector 75 is arranged in a path through which the sending apparatus 70 circulates water.

Figure 12:
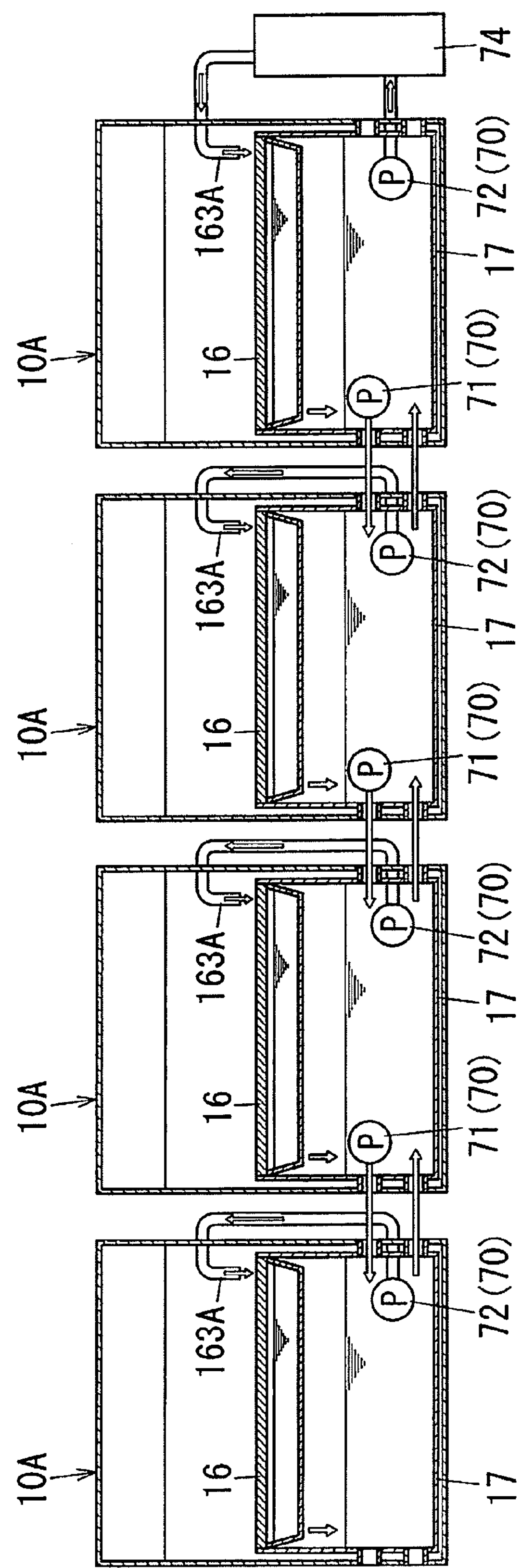
FIG. 12 is a diagram illustrating yet another configuration example of the present embodiment.

In the configuration example shown in FIG. 10, the two boxes 10A are horizontally arranged, however, the number of boxes 10A is not especially limited. For example, as shown in FIG. 12, four boxes 10A may be arranged. Even if the number of boxes 10A is modified, the configuration of connecting two adjacent boxes 10A and 10A is the same as the configuration shown in FIG. 10.

Namely, reservoirs 17 and 17 of two boxes 10A are connected with each other through two pipelines 73, and water is circulated between reservoirs 17 and 17 of two adjacent boxes 10A. Referring to the configuration shown in FIG. 12, it is clear that water in each reservoir 17 is sent between two adjacent boxes 10A and 10A in turn. For the reason above, notwithstanding the number of boxes 10A, temperature differences of water stored in the reservoirs 17 are reduced.

Here, in the configuration example shown in FIG. 1, the pipes 51 need to be combined into one (a constant flow distribution header) so that the pipes 51 respectively connected to the boxes 10 are connected to the water supply apparatuses 54. In other words, constant flow distribution headers having different configurations are required, depending on the number of boxes 10A. On the other hand, in the configuration shown in FIG. 10, when the number of boxes 10A is increased or decreased, it is only required that the number of pipelines 73, each of which connects two adjacent boxes 10A and 10A, is increased or decreased. Therefore, it is possible to cope with increasing or decreasing of the number of boxes 10A by only increasing or decreasing the number of members with the same specifications. In other words, the number of boxes 10A can be increased or decreased without increasing of product types.

Figure 13:
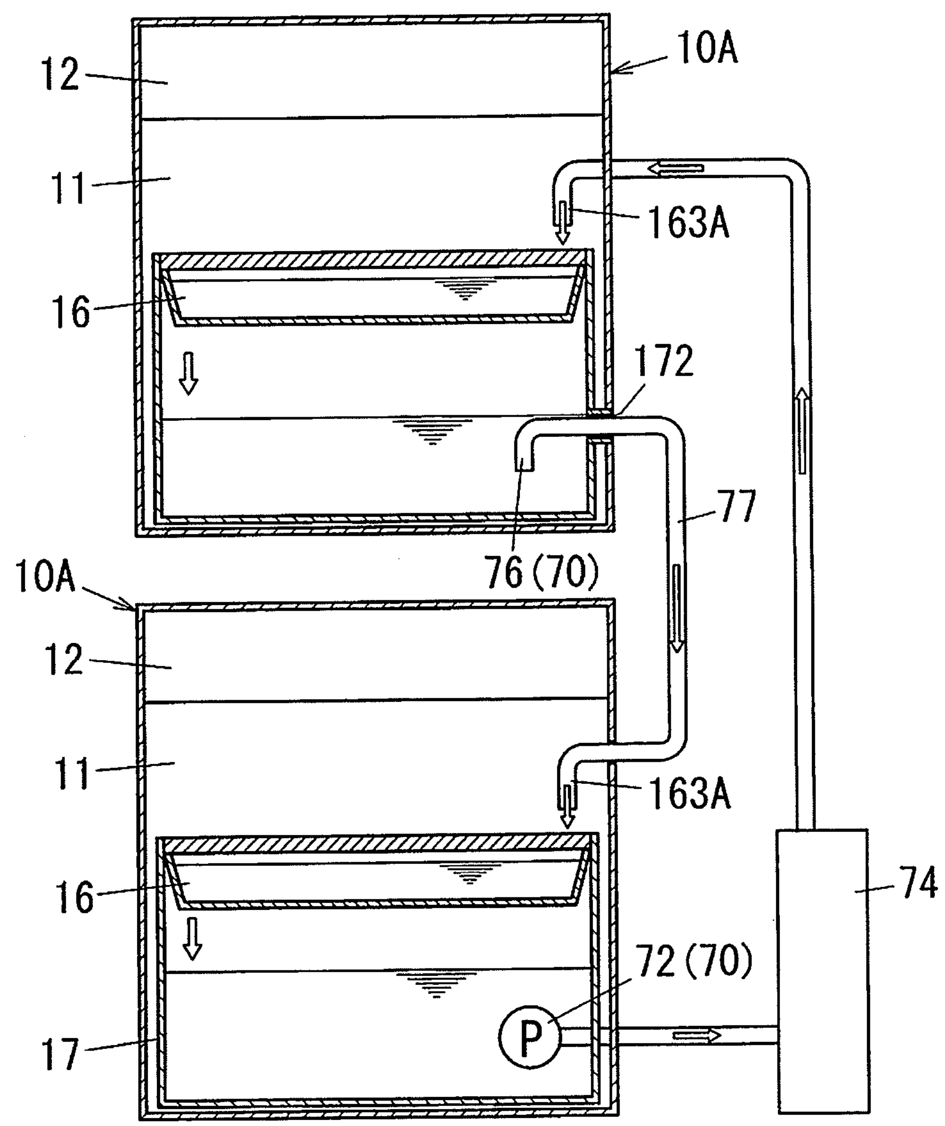
FIG. 13 is a diagram illustrating yet another configuration example of the present embodiment.

In the configuration example shown in FIG. 10 and FIG. 12, the plurality of boxes 10A are horizontally arranged, however, the plurality of boxes 10A may be vertically arranged as shown in FIG. 13. FIG. 13 shows a configuration example in which two boxes 10A are vertically arranged. The upper box 10A is provided in its own reservoir 17 with an overflow pipe 76, and the overflow pipe 76 is connected to an outflow port 172. Water drained from the outflow port 172 through the overflow pipe 76 is supplied to the water injection pipe 163A of the lower box 10A through a pipeline 77. On the other hand, water is pumped from the reservoir 17 of the lower box 10A with the pump 72, and is supplied to the water injection pipe 163A of the upper box 10A through the chiller 74.

In other words, in the configuration example shown in FIG. 13, water stored in the reservoir 17 of the lower box 10A is pumped with the pump 72, and is supplied to the cultivation container 16 of the upper box 10A through the water injection pipe 163A after passing through the chiller 74. Water drained from the cultivation container 16 of the upper box 10A through the drainpipe 167 (refer to FIG. 4) to be stored in the reservoir 17 is supplied to the cultivation container 16 of the lower box 10A through the water injection pipe 163A after passing through the overflow pipe 76. Water stored in the reservoir 17 from the cultivation container 16 through the drainpipe 167 is again pumped with the pump 72, and supplied to the upper box 10A. Consequently, the overflow pipe 76 is one of members configuring the sending apparatus 70 that circulates water between the reservoirs 17 of the two boxes 10A.

By the above operation, water can be circulated between the two boxes 10A vertically arranged. Here, the inflow ports 171 and the outflow ports 172 of the upper and lower boxes 10A are closed except an outflow port 172 of the upper box 10A, into which the overflow pipe 76 is connected. It is required that the overflow pipe 76 has a relatively large diameter to prevent clogging by floating matters in the reservoir 17, and moreover, it is preferable that the overflow pipe 76 is provided with a strainer. In the case of this configuration, it is preferable that a capacity of the reservoir 17 of the lower box 10A is designed to be larger than that of the upper box 10A. Namely, a capacity of water is adjusted with the reservoir 17 of the lower box 10A.

Figure 14:
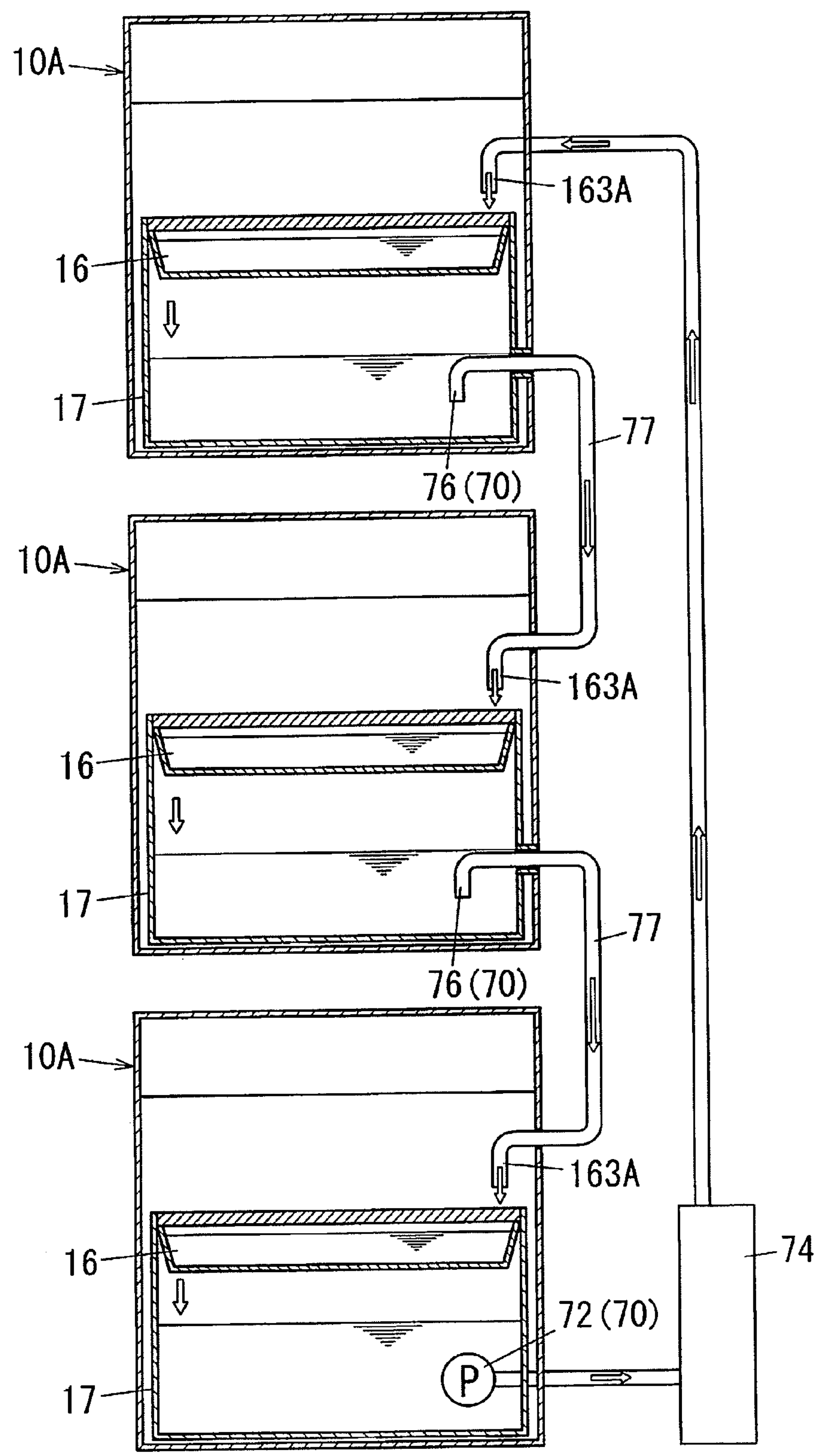
FIG. 14 is a diagram illustrating yet another configuration example of the present embodiment.

FIG. 13 shows the configuration example in which the two boxes 10A are vertically arranged, however, even when three or more boxes 10A are vertically arranged as shown in FIG. 14, the same composition is adopted. In addition, as shown in FIG. 15, the configuration shown in FIG. 10 or FIG. 12 may be combined with the configuration shown in FIG. 13 or FIG. 14.

Figure 15:
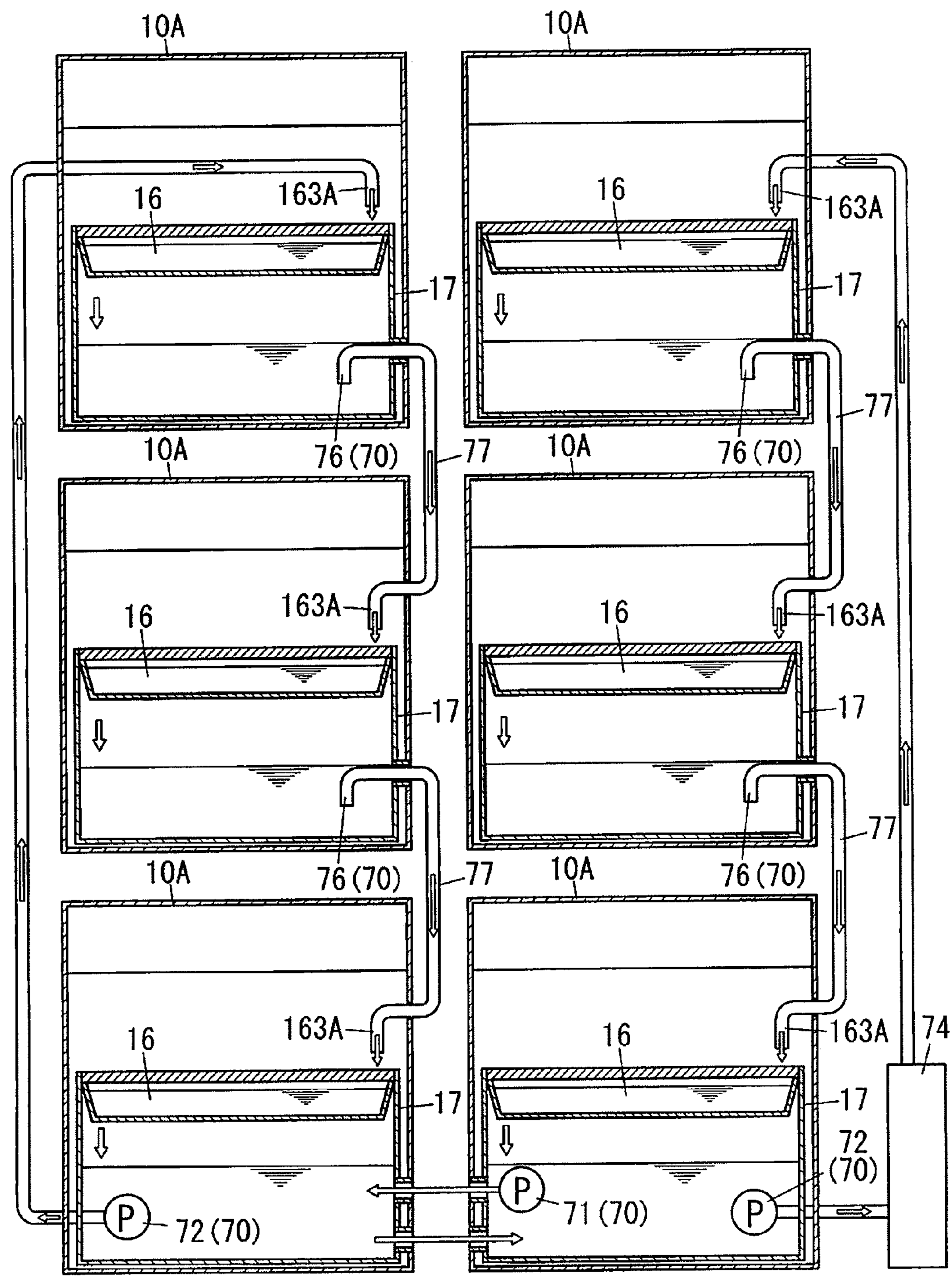
FIG. 15 is a diagram illustrating yet another configuration example of the present embodiment.

FIG. 15 shows a configuration example in which six boxes 10A in total are used, and three sets, each including two boxes 10A horizontally arranged, are vertically arranged. Regarding two bottom boxes 10A, the inflow ports 171 and the outflow ports 172 are connected with each other through the pipelines 73, similarly to the example shown in FIG. 10. Water is pumped from the reservoirs 17 and 17 with the pumps 72 and 72 respectively provided in the two bottom boxes 10A, and supplied to the water injection pipes 163A and 163A of two top boxes 10A. The chiller 74 is provided between one of the two bottom boxes 10A and one of the two top boxes 10A.

The overflow pipes 76 are respectively provided in the two top boxes 10A and 10A and two middle boxes 10A and 10A. Water passing through the overflow pipes 76 and 76 in the two top boxes 10A and 10A is supplied to the water injection pipes 163A and 163A of the two middle boxes 10A and 10A through pipelines 77 and 77. Water passing through the overflow pipes 76 and 76 in the two middle boxes 10A and 10A is supplied to the water injection pipes 163A and 163A of the two bottom boxes 10A and 10A through pipelines 77 and 77.

Thus, it is possible to circulate water through all boxes 10A also in the configuration shown in FIG. 15. In addition, it is possible to circulate water through the six boxes 10A only with one pump 71 and two pumps 72 in the configuration example shown in FIG. 15. Therefore, it is possible to circulate water through the plurality of boxes 10A with the small number of pumps 71 and 72.

Figure 16A:
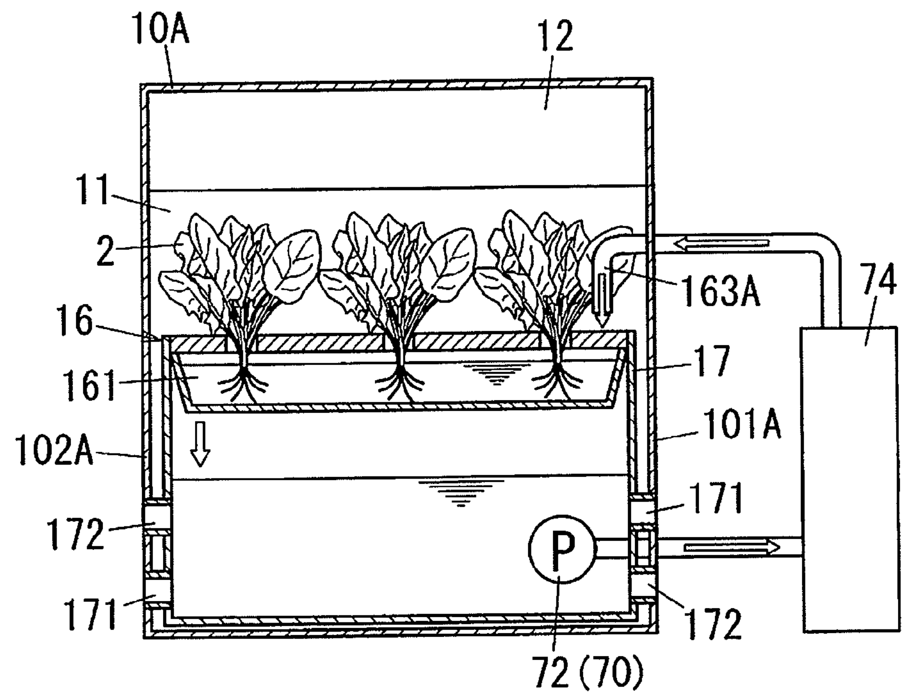
FIG. 16A and FIG. 16B are configuration diagrams illustrating usage examples of the box used for the present embodiment.
Figure 16B:
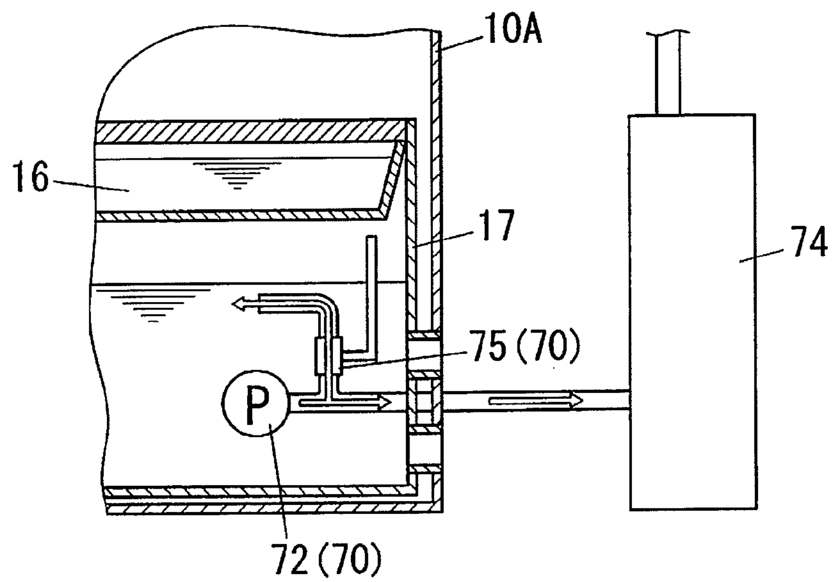

In the configuration example described above, it is assumed that the plurality of boxes 10A are connected when used, however, only one box 10A may be used to cultivate the plants 2, as a minimum configuration. For example, as shown in FIGS. 16A and 16B, the inflow ports 171 and the outflow ports 172 of a box 10A may be closed, and water pumped from the reservoir 17 with the pump 72 may be supplied to the water injection pipe 163A of the same box 10A. In this case, it is possible to realize the configuration with only one box 10A. It is preferable that the chiller 74 is used also in this configuration example. Because of the only one box 10A, as shown in FIG. 16B, a channel for water to be supplied to the water injection pipe 163A from the pump 72 is separated into two channels, and the ejector 75 is provided in one of the separated channels. Water separated is made to flow back in the reservoir 17 for stirring water in the reservoir 17, which contributes to homogenize temperature of water in the reservoir 17.

Thus, because the plants 2 can be cultivated also with the only one box 10A, as one example of a using method, it is possible that the plants 2 are started cultivating in the only one box 10A at first, and after that, the number of boxes 10A is gradually increased.

Although the present invention has been described with reference to certain preferred embodiments, numerous modifications and variations can be made by those skilled in the art without departing from the true spirit and scope of this invention, namely claims.

The invention claimed is:

1. A plant cultivation device, comprising:

a plurality of boxes arranged in a line, each of which is provided in an inner space thereof with a cultivation chamber for cultivating a plant and a light source housing chamber for housing a light source;

a connection unit configured to mutually connect two adjacent boxes of the plurality of boxes; and an end section unit mounted to an end section of a box in an end of the line of the plurality of boxes arranged in the line, the end section of the box being unconnected to the connection unit, the plurality of boxes, the connection unit and the end section unit being incorporated into furniture, each of the plurality of boxes further comprising a ventilation opening provided for ventilation in the cultivation chamber, and a ventilation port provided for air cooling in the light source housing chamber, and each of the connection unit and the end section unit comprising a first ventilation passage through which air flows into the ventilation opening, and a second ventilation passage through which air flows into the ventilation port.

2. The plant cultivation device of claim 1, wherein the ventilation opening includes a first ventilation opening provided in one wall of each box in a direction in which the plurality of boxes are arranged, and a second ventilation opening provided in an other wall of each box, the ventilation opening being configured to introduce air into the cultivation chamber through the first ventilation opening, the ventilation opening being configured to exhaust air from the cultivation chamber through the second ventilation opening, and the ventilation port includes a first ventilation port opening in the one wall of each box in which the first ventilation opening is provided, and a second ventilation port opening in the other wall of each box in which the second ventilation opening is provided, the ventilation port being configured to introduce air into the light source housing chamber through the first ventilation port, the ventilation port being configured to exhaust air from the light source housing chamber through the second ventilation port.

3. The plant cultivation device of claim 2, wherein the first ventilation passage of the end section unit has one end opening downward and an other end facing the ventilation opening, the second ventilation passage of the end section unit having one end opening downward and an other end facing the ventilation port.

4. The plant cultivation device of claim 2, wherein the first ventilation passage of the end section unit has one end opening downward and an other end facing the ventilation opening, the second ventilation passage of the end section unit having one end opening downward and an other end facing the ventilation port, and the furniture comprises therein a third ventilation passage through which air flows between the furniture and the end section unit, and a vent port through which air flows between the furniture and outside of the furniture in at least part of a wall surrounding the third ventilation passage.

5. The plant cultivation device of claim 1, wherein the first ventilation passage of the end section unit has one end opening downward and an other end facing the ventilation opening, the second ventilation passage of the end section unit having one end opening downward and an other end facing the ventilation port.

6. The plant cultivation device of claim 5, wherein the furniture comprises therein a third ventilation passage through which air flows between the furniture and the end section unit, and a vent port through which air flows between the furniture and outside of the furniture in at least part of a wall surrounding the third ventilation passage.

7. The plant cultivation device of claim 1, wherein the first ventilation passage of the end section unit has one end opening downward and an other end facing the ventilation opening, the second ventilation passage of the end section unit having one end opening downward and an other end facing the ventilation port, and the furniture comprises therein a third ventilation passage through which air flows between the furniture and the end section unit, and a vent port through which air flows between the furniture and outside of the furniture in at least part of a wall surrounding the third ventilation passage.

8. The plant cultivation device of claim 1, wherein each of the plurality of boxes further comprises a reservoir provided besides the cultivation chamber and the light source housing chamber, the reservoir being configured to reserve liquid to be applied to the plant, and the plant cultivation device further comprises a sending apparatus sending the liquid from the reservoir of one box of two or more boxes among the plurality of boxes, the sending apparatus being configured to circulate the liquid in a path through the reservoir of an other box of the two or more boxes.

9. The plant cultivation device of claim 8, wherein each of the plurality of boxes comprises an inflow port taking the liquid from outside into the reservoir, and an outflow port taking out the liquid reserved in the reservoir, and the sending apparatus has a function of circulating the liquid between more than one box through inflow ports and outflow ports of the more than one box, reservoirs of the more than one box being mutually connected through the inflow ports and outflow ports.

10. The plant cultivation device of claim 8, wherein the sending apparatus includes a submersible pump arranged in the reservoir.

11. The plant cultivation device of claim 8, wherein the sending apparatus includes an ejector configured to mix air to the liquid in a channel flowing the liquid.

12. A box, used for the plant cultivation device of claim 1.

13. An end section unit, used for the plant cultivation device of claim 1.

* * * * *